US011271738B1

(12) United States Patent
Kumar

(10) Patent No.: US 11,271,738 B1
(45) Date of Patent: Mar. 8, 2022

(54) SECURE, RELIABLE, AND DECENTRALIZED COMMUNICATION IN CLOUD PLATFORM

(71) Applicant: SAP SE, Walldorf (DE)

(72) Inventor: Dinesh Kumar, Bangalore (IN)

(73) Assignee: SAP SE, Walldorf (DE)

( * ) Notice: Subject to any disclaimer, the term of this patent is extended or adjusted under 35 U.S.C. 154(b) by 14 days.

(21) Appl. No.: 17/060,891

(22) Filed: Oct. 1, 2020

(51) Int. Cl.
*H04L 9/00* (2006.01)
*H04L 9/14* (2006.01)
*H04L 9/08* (2006.01)
*H04L 9/32* (2006.01)

(52) U.S. Cl.
CPC .............. *H04L 9/14* (2013.01); *H04L 9/0825* (2013.01); *H04L 9/0838* (2013.01); *H04L 9/0861* (2013.01); *H04L 9/0894* (2013.01); *H04L 9/3236* (2013.01); *H04L 2209/16* (2013.01)

(58) Field of Classification Search
CPC ....... H04L 9/14; H04L 9/0825; H04L 9/0838; H04L 9/0861; H04L 9/0894; H04L 9/3236; H04L 2209/16
See application file for complete search history.

(56) References Cited

U.S. PATENT DOCUMENTS

2004/0039919 A1\* 2/2004 Takayama ............... G06Q 20/04
713/180
2007/0271459 A1\* 11/2007 Gomez ................. H04L 63/062
713/171
(Continued)

*Primary Examiner* — Mohammad A Siddiqi
(74) *Attorney, Agent, or Firm* — Buckley, Maschoff & Talwalkar LLC

(57) ABSTRACT

A Secure, Reliable, and Decentralized Communication ("SRDC") system may initialize primary and auxiliary processes associated with a mobile application, including creation of an Obfuscated Symmetric Primary Key ("OSPK") and an Obfuscated Symmetric Auxiliary Key ("OSAK"). A cipher key manager may apply a two-way function f( ) to generate two subkeys: SPAK1 (designated $(SPAK)_{primary}$) and SPAK2 (designated $(SPAK)_{auxiliary}$). $(SPAK)_{auxiliary}$ may be encrypted using $(SPAK)_{primary}$ to obtain $(E-SPAK)_{auxiliary}$. OSAK may be de-obfuscated to obtain Symmetric Auxiliary Key ("SAK") and $(E-SPAK)_{auxiliary}$ may be encrypted using SAK to obtain $(EE-SPAK)_{auxiliary}$. A key obfuscator may be called to de-obfuscate OSPK to obtain Symmetric Primary Key ("SPK"). $(SPAK)_{primary}$ may then be encrypted using SPK to obtain $(E-SPAK)_{primary}$. The SRDC system may communicate with a CP mobile service and store $(E-SPAK)_{primary}$ in a storage service. Data Encryption Key ("DEK") may be generated, encrypted with SPAK and stored in the keychain persistent store of the primary process.

22 Claims, 27 Drawing Sheets

(56) References Cited

U.S. PATENT DOCUMENTS

| | | | |
|---|---|---|---|
| 2012/0179909 A1* | 7/2012 | Sagi | H04L 9/0872 |
| | | | 713/167 |
| 2013/0091351 A1* | 4/2013 | Manges | H04L 63/0471 |
| | | | 713/153 |
| 2014/0068273 A1* | 3/2014 | Sobel | G06F 21/604 |
| | | | 713/189 |
| 2014/0143534 A1* | 5/2014 | Chastain | H04W 12/35 |
| | | | 713/150 |

* cited by examiner

| SRDC IDENTIFIER 1402 | MOBILE APPLICATION IDENTIFIER 1404 | PRIMARY PROCESS IDENTIFIER 1406 | AUXILIARY PROCESS IDENTIFIER 1408 |
|---|---|---|---|
| SRDC_101 | MA_101 | PP_101 | AP_101 |
| SRDC_101 | MA_102 | PP_102 | AP_102 |

SECURE, RELIABLE, AND DECENTRALIZED COMMUNICATION IN CLOUD PLATFORM

BACKGROUND

An enterprise may utilize mobile applications or services executing in a cloud computing environment. For example, a business might utilize mobile applications that process purchase orders, human resources tasks, payroll functions, etc. These applications and associated services may be developed using a Software Development Kit ("SDK"). In some cases, application "extensions" (or widgets) may be provided to give users access to an applications functionality and content throughout an OS. Such extensions, however, have limitations (e.g., they may be unable to receive user input such as a code entered via a keyboard or biometric information). Similarly, an extension process may be unable to access in memory code or data sections of a containing application process. As a result, challenges may arise when attempting to establish secure communication between a mobile containing application process and an extension application process.

It would be desirable to provide secure, reliable, and decentralized communication between a mobile application process and extended mobile application processes in an automatic and accurate manner.

SUMMARY

Methods and systems may be associated with a Secure, Reliable, and Decentralized Communication ("SRDC") system that initialize primary and auxiliary processes associated with a mobile application creating an Obfuscated Symmetric Primary Key ("OSPK") and an Obfuscated Symmetric Auxiliary Key ("OSAK"). A cipher key manager may apply a two-way function f) to generate two subkeys: SPAK1 (designated $(SPAK)_{primary}$) and SPAK2 (designated $(SPAK)_{auxiliary}$). $(SPAK)_{auxiliary}$ may be encrypted using $(SPAK)_{primary}$ to obtain $(E\text{-}SPAK)_{auxiliary}$. OSAK may be de-obfuscated to obtain Symmetric Auxiliary Key ("SAK") and $(E\text{-}SPAK)_{auxiliary}$ may be encrypted using SAK to obtain $(EE\text{-}SPAK)_{auxiliary}$ which is stored in the keychain persistent store of the auxiliary process. A key obfuscator may be called to de-obfuscate OSPK to obtain Symmetric Primary Key ("SPK"). $(SPAK)_{primary}$ may then be encrypted using SPK to obtain $(E\text{-}SPAK)_{primary}$. The SRDC system may then communicate with a CP mobile service and store $(E\text{-}SPAK)_{primary}$ in the storage service provided by CP mobile services. Data Encryption Key ("DEK") may be generated, encrypted with SPAK and stored in the keychain persistent store of the primary process.

Some embodiments comprise: means for initializing, by a Secure, Reliable, and Decentralized Communication ("SRDC") system, a primary process associated with the mobile application, including creation of an Obfuscated Symmetric Primary Key ("OSPK"); means for initializing an auxiliary process associated with the mobile application, including creation of an Obfuscated Symmetric Auxiliary Key ("OSAK"); means for calling by a cipher key manager, a key generator module to create a Symmetric Paired Access Key ("SPAK"); means for applying, by the cipher key manager, a two-way function f( ) to generate two subkeys: SPAK1 and SPAK2; means for designating SPAK1 to the primary process as $(SPAK)_{primary}$; means for designating SPAK2 to the auxiliary process as $(SPAK)_{auxiliary}$; means for encrypting, by an encryption module, $(SPAK)_{auxiliary}$ using $(SPAK)_{primary}$ to obtain a result $(E\text{-}SPAK)_{auxiliary}$; means for calling, by the cipher key manager, a key obfuscator to de-obfuscate OSAK to obtain Symmetric Auxiliary Key ("SAK"); means for calling, by the cipher key manager, the encryption module and encrypt $(E\text{-}SPAK)_{auxiliary}$ using SAK to obtain $(EE\text{-}SPAK)_{auxiliary}$; means for storing the $(EE\text{-}SPAK)_{auxiliary}$ in the keychain persistent store of the auxiliary process; means for calling, by the cipher key manager, a key obfuscator to de-obfuscate OSPK to obtain Symmetric Primary Key ("SPK"); means for calling, by the cipher key manager, the encryption module and encrypt $(SPAK)_{primary}$ using SPK to obtain the result $(E\text{-}SPAK)_{primary}$; means for communicating, by the cipher key manager, with a Cloud Platform ("CP") mobile service and store $(E\text{-}SPAK)_{primary}$ in the storage service provided by CP mobile services; means for calling, by the cipher key manager, the key generator to generate a Data Encryption Key ("DEK"); and means for encrypting, by the cipher key manager, DEK obtained using SPAK and storing it in the keychain persistent store exclusive to the primary process.

Some technical advantages of some embodiments disclosed herein are improved systems and methods to provide secure, reliable, and decentralized communication between a mobile application process and extended mobile application processes in an automatic and accurate manner.

BRIEF DESCRIPTION OF THE DRAWINGS

FIG. 14 illustrates a SRDC database in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
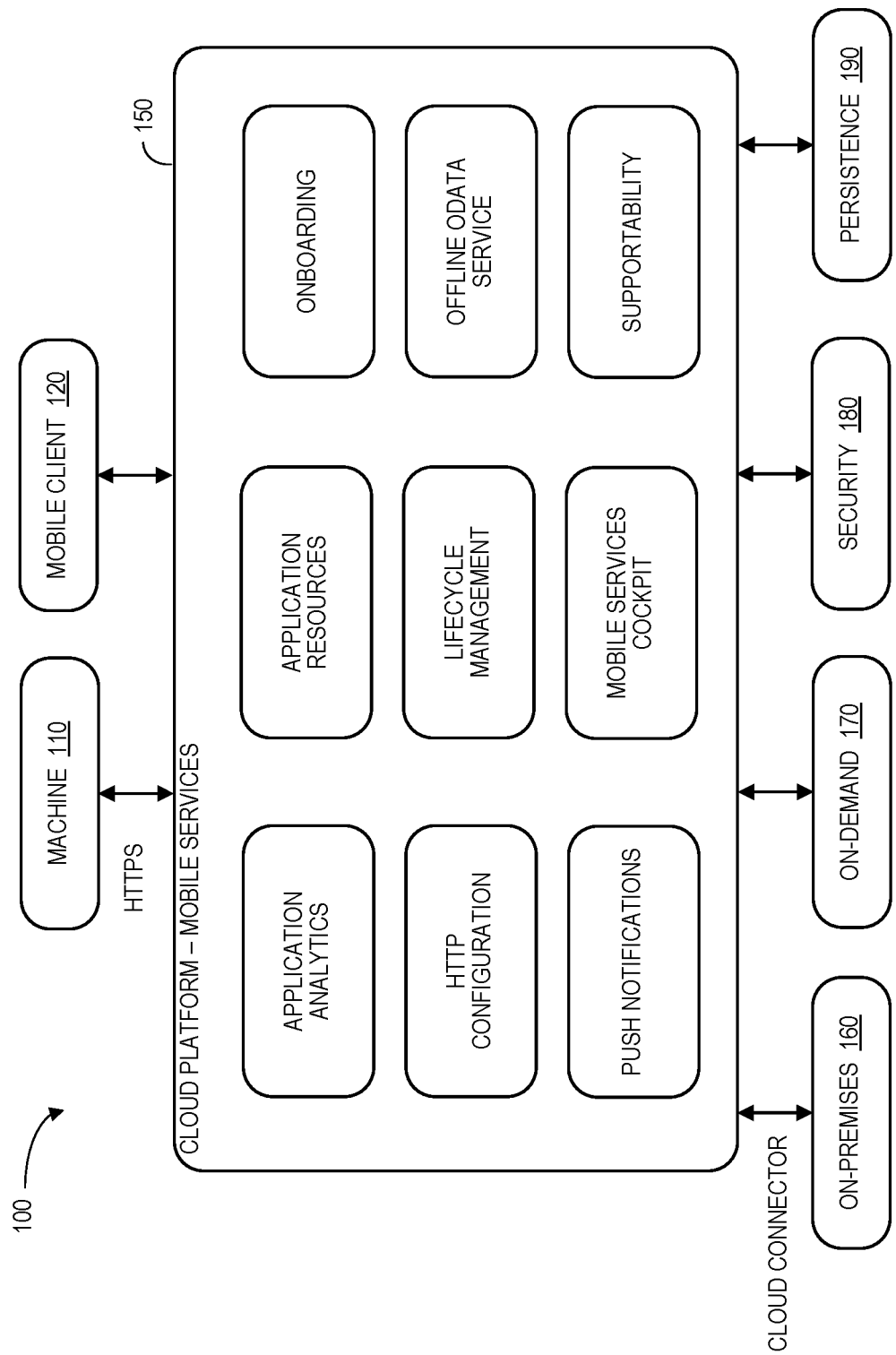
FIG. 1 is a cloud platform system in accordance with some embodiments.

Some embodiments described herein provide Secure, Reliable, and Decentralized Communication ("SRDC") between a mobile application process and extended mobile application processes in connection with a cloud platform Software Development Kit ("SDK"). FIG. 1 is a cloud platform system 100 including a cloud platform mobile services 150 that communication with machines 110 mobile clients 120 (including native applications and web application) via HyperText Transfer Protocol Secure ("HTTPS") communications. Cloud platform mobile services 150 is an open, standards-based cloud platform that enables simple mobile application development, configuration, and management. Cloud platform mobile services 150 may provide services to mobile applications and inbuilt feature rich SDKs so that application developers can focus more on the business logic and other required services are available "out of the box" in an easy to use manner. Mobile application services might include, for example, crucial Application Programming Interfaces ("APIs") such as application analytics, application resources, onboarding, lifecycle management, an offline Open Data ("OData") protocol service, push services, supportability, etc. Cloud platform mobile services 150 can expose on-premise back-end services 160 through a cloud connector, and on-demand back-end services 170 directly, as well as security features 180 and persistence 190.

Figure 2:
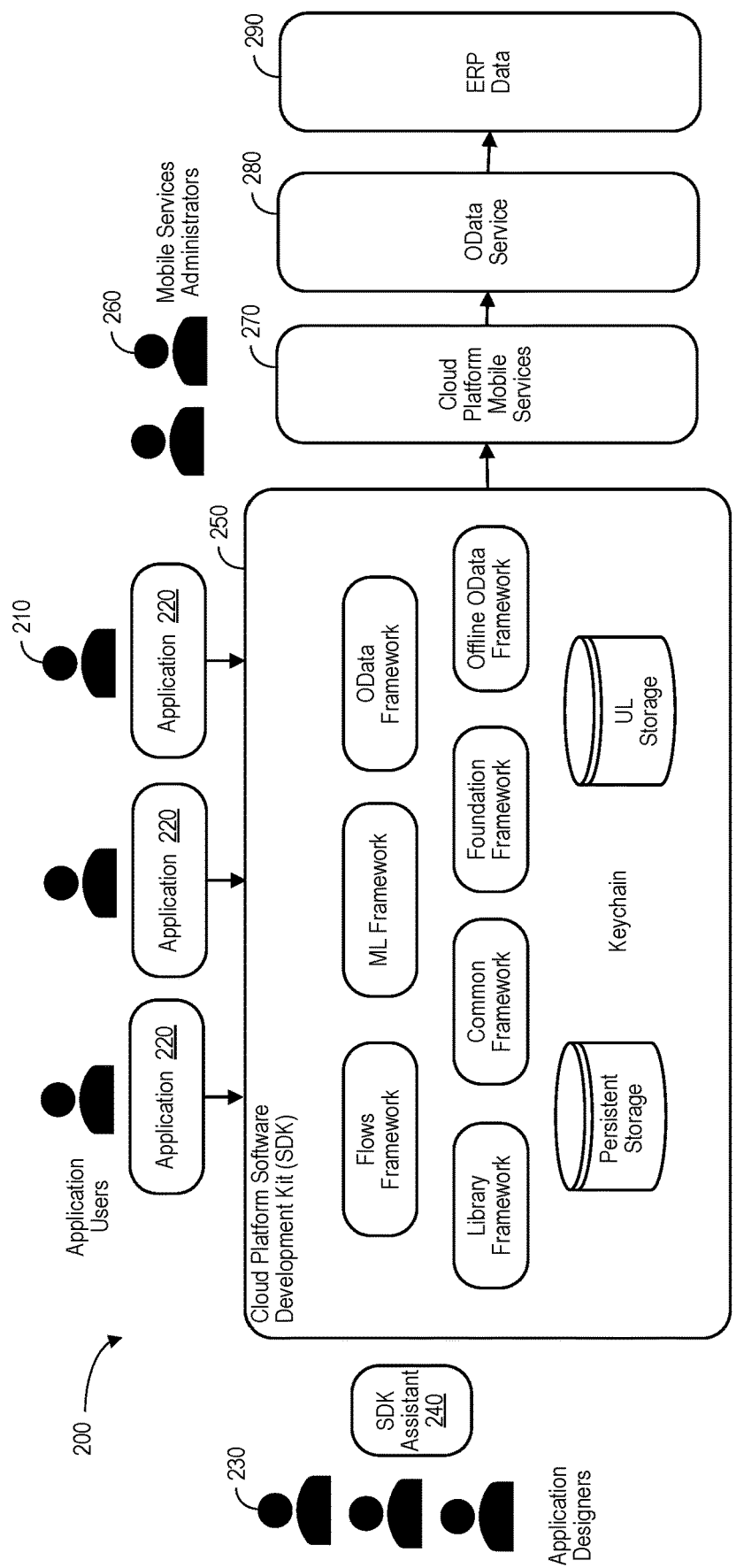
FIG. 2 is a high-level device-side architecture diagram of a cloud platform for a software development kit according to some embodiments.

FIG. 2 is a high-level device-side architecture 200 of a cloud platform for an SDK, such as one associated with iOS according to some embodiments. Application users 210 access a cloud platform SDK 250 via applications 220 running on iOS devices. The applications 220 may be, for example, created by application developers 230 via a cloud platform SDK for iOS assistant 240. Moreover, mobile services administrators 260 may use cloud platform mobile services 270 (e.g., onboarding, push, logging, OData proxy, etc.) to interact with Enterprise Resource Planning ("ERP") data 290 via an OData service 280.

Such a cloud platform SDK 250 for iOS may let a user quickly develop native applications, such as with Swift, for Apple devices. Although iOS is used to describe some embodiments described herein, not that any of the embodiments might instead be associated with Android or other similar devices. The SDK 250 may include critical modular components such as foundation, common, flows, etc. which provide a plethora of features including authentication, storage, networking, file systems, etc. out of the box, so that a developer 230 can focus on the application logic. The SDK 250 also provides relevant APIs to communicate with the various mobile services 270 in the cloud platform.

One of the latest developments in iOS mobile application development is the introduction of widgets/application extensions. Application extensions give users access to an application's functionality and content throughout iOS and macOS. For example, consider a social networking application. In this case, a developer of the social networking application can create a "social networking" extension which can be used by a Photos application to share pictures with the social networking application. In this example, the social networking application may be referred to as a "containing" application, and the Photos application may be referred to as a "host" application.

One important type of extension is "Today" extensions. These are application extensions in the "Today" view (and are also called widgets). Widgets give users quick access to information that is important right now. For example, users open the Today view (when swiping down on a mobile device) to check current stock prices or weather conditions, see today's schedule, or perform a quick task such as marking an item as done. Users tend to open the Today view frequently, and they expect the information they are interested in to be instantly available. These let developers present information in a notification center and lock screen (and are a great way to provide immediate and up-to-date information of interest to users). Today extensions can also appear on a search screen and on a quick action menu on the home screen when using 3D touch. For example, the Today extension (in the notification messages area) can show recent weather details for a weather application, products with a recently discounted price, approve/reject requests for a work order mobile application, etc.

Mobile application extensions provide an easy way to extend a mobile application's features in a convenient manner without needing to open the mobile application. Thus, application developers can show various relevant information like recent products, updated value of interested stocks, and also perform click operations such as approve/reject/delete, etc. The following are some important aspects of Today extensions:

it is not possible to input (keyboard entry) any information to a Today extension, even though an application extension bundle is nested within its containing application's bundle, the running application extension and containing application have no direct access to each other's containers, the Today extension process and containing application process are two different processes in the iOS operating system, and as a consequence, the Today extension process cannot access the in-memory Code Section ("CS") or the Data Section ("DS") of the containing application process.

There are several security challenges associated with mobile application processes and associated extension processes. For example, in order to make sure that mobile applications (and hence data) cannot be accessed by unauthorized users, SDK provides necessary modules to support user passcodes, which requires some form of user input, such as a user passcode via keyboard, user biometric info, a Quick Response ("QR"), etc. before accessing the mobile application. An application extension may need to communicate with the application to retrieve data, metadata and many other vital information. Since most mobile applications are multi-user in nature (and also owing to the fact that encryption key has to be random and also depend on the user), user's input is used for data encryption. This results in challenges during inter-process communications between iOS processes like a containing application and a corresponding application extension. This is primarily because there is no mechanism for user authentication (since there is no user input like biometric, keyboard, etc.) in processes which correspond to application extensions.

Also, there is no mechanism by which an in-memory section of one process (of a containing application) can be accessed by another process (an application extension process).

Another factor that adds to security challenges is the fact that a containing application could be in a terminated state at any point in time. This means that all in-memory data structures related to encryption are not available. They can be only initialized when user again launches the application with appropriate user credentials. An application extension process could be used at any point in time—even when the containing application process is terminated. This makes it impossible to secure the communication channel and access secure data. Thus, there is no way to establish a secure communication between containing application process and extension application processes. Note that there could be several extension processes associated with the containing application process. There is no default security mechanism to granularly secure the communication between the containing application process and the associated extension processes.

Figure 3:
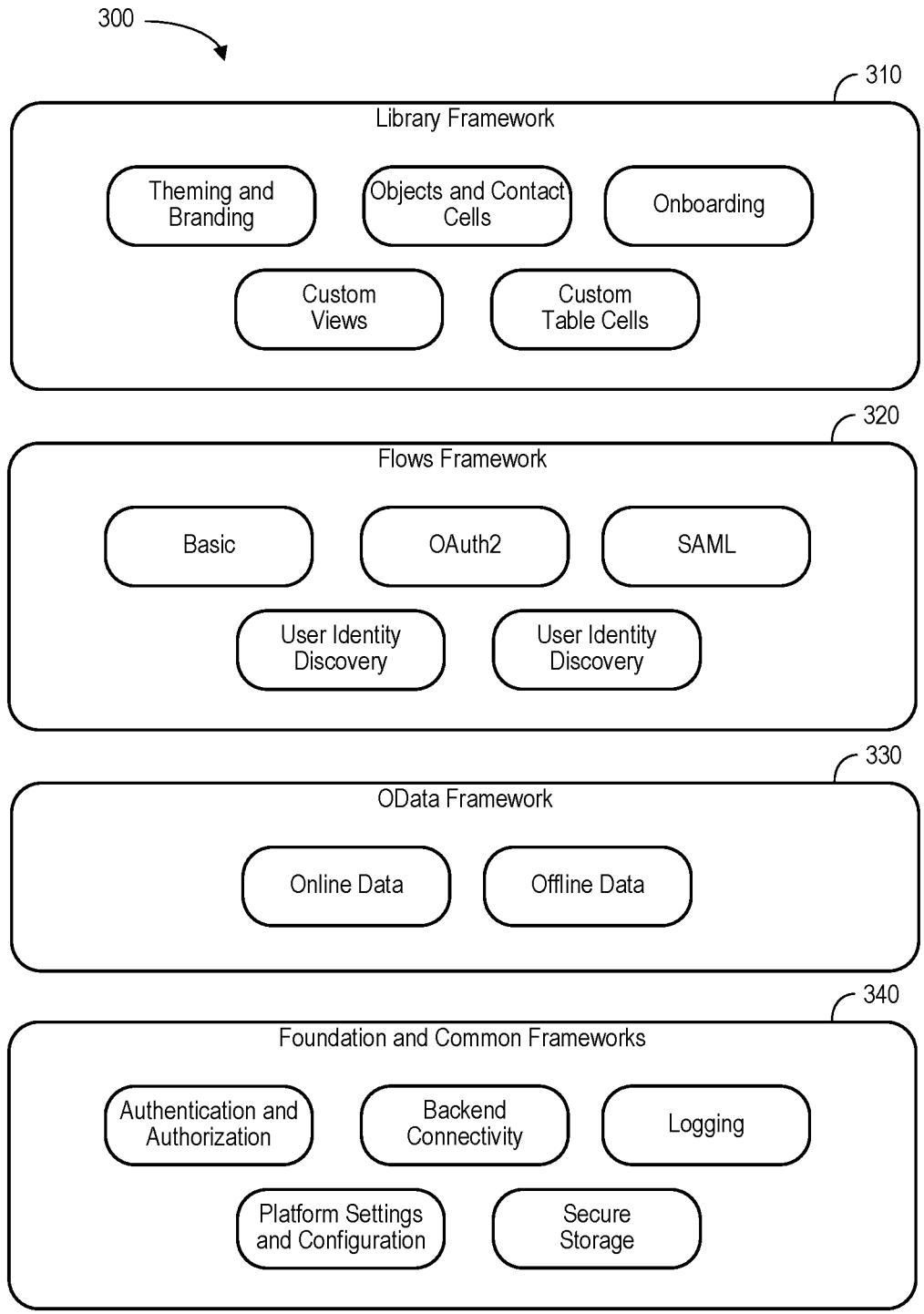
FIG. 3. illustrates some data security components in accordance with some embodiments.

FIG. 3. illustrates 300 some data security components in accordance with some embodiments. Components might include, for example, a library framework 310, a flow framework 320, an OData framework 330, foundation and common frameworks 340, etc. The library framework 310 might include theming and branding, objects and contact cells, onboarding, custom views, custom table cells, etc. In general, the library framework 310 might be associated with a User Interface ("UI") experience and components (without business logic) and allow for customization to meet organizational standards. The flow framework 320 might include basic, OAuth2, Security Assertion Mark-up Language ("SAML"), user identity discovery, etc. to implement various onboarding scenarios and/or provide a series of steps to complete an onboarding process. The OData framework 330 might include online and offline data. The OData framework 330 may provide data integration, parse OData payloads, produce OData requests, handle responses, and/or provide separate frameworks for online and offline applications. The foundation and common frameworks 340 might include authentication and authorization, backend connectivity, logging, platform settings and configuration, secure storage, etc. The foundation and common frameworks 340 may provide environment integration via atomic, generic functioning, and well-separated components.

The data security layer in SDK is designed as described in connection with FIGS. 4A through 12C. In order to make sure that mobile applications (and hence data) cannot be accessed by unauthorized users, SDK provides necessary modules to support user passcodes, which requires user to enter passcode via keyboard before accessing the mobile application, along with other authentication mechanisms.

Mobile applications fetch data from the configured backends using OData/Restful methods and persist it in the local storage of the device using SDK. Since this data is critical to the users and data privacy is a significant concern, it is first encrypted and then stored in any of the data stores supported by SDK.

Since most of the mobile applications are multi-user in nature (and also owing to the fact that encryption key has to be random and also depend on the user), a user's passcode along with appropriate SALT is used to generate appropriate keys, which is in turn are used for encrypting the data. In order to make sure that encryption module is not susceptible to attackers, a user passcode or encryption key is never persisted in the file system or in any form of persistent data stores supported by SDK.

With the above challenges and data security design in mind, a SRDC approach between a mobile application process and other extended mobile application processes will now be provided. The following data structures and methods work in unison with the existing data security architecture to achieve the required security. As used herein, a containing application is referred to as a "primary process" and application extensions/widgets are referred to as "auxiliary processes."

Figure 4A:
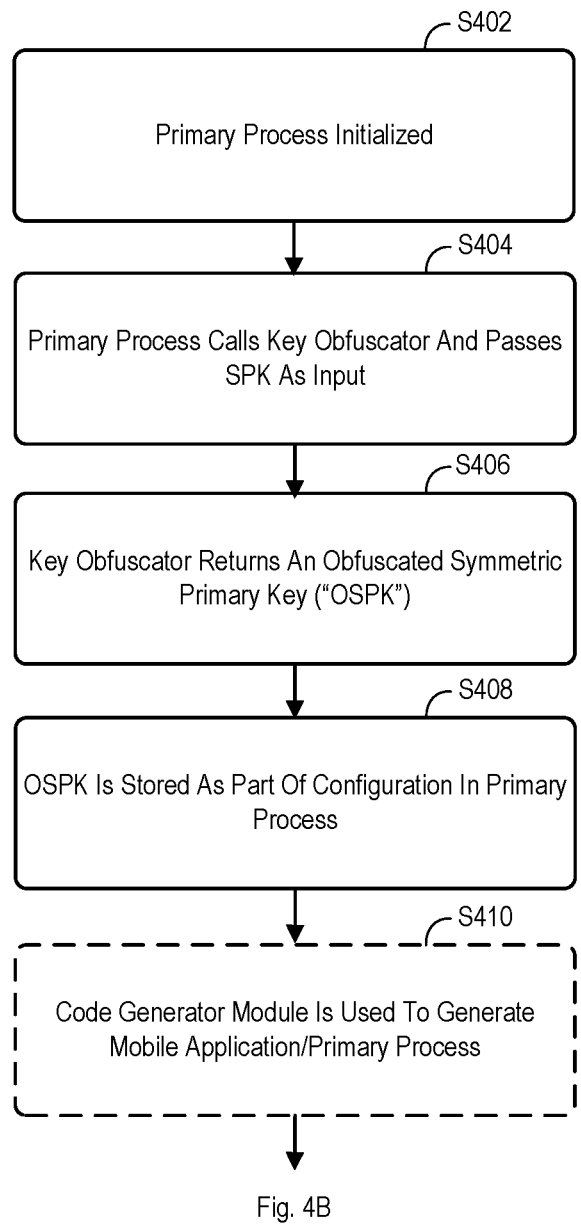
FIGS. 4A and 4B are a mobile application launch method according to some embodiments.
Figure 4B:
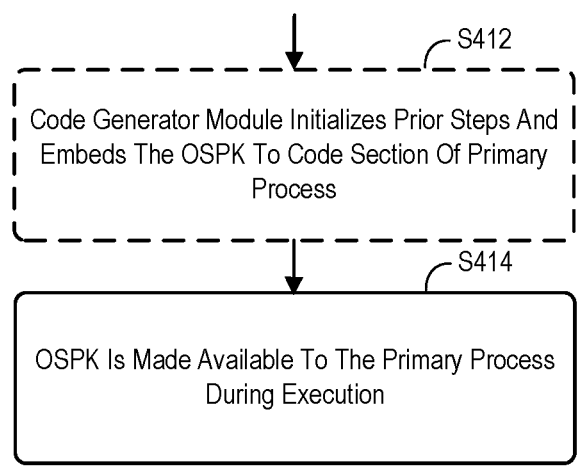

FIGS. 4A and 4B are a mobile application launch method according to some embodiments. That is, when a mobile application is launched for the first time, the following steps are performed. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S402, a primary process is initialized. In particular, a key generator component in SDK can be used to generate encryption keys (symmetric and/or asymmetric in nature). As part of the initialization, the primary process makes uses of the key generator module to create a symmetric key called a Symmetric Primary Key ("SPK"). At S404, the primary process calls a key obfuscator and passes the SPK generated from S402 as input. The key obfuscator is a component that obfuscates any strings or stream of bytes so that it cannot be used in the current form for its intended use by reverse engineering the byte code associated with any high-level language.

At S406, the key obfuscator returns an Obfuscated SPK ("OSPK"). At S408, the OSPK is stored as part of a configuration in the primary process. In another embodiment (illustrated with dashed lines in FIGS. 4A and 4B), a code generator module may be used to generate the mobile application/primary process at S410, and the code generator module initializes and embeds the OSPK to the code section of primary process at S412. In either embodiment, the OSPK is made available to the primary process during execution at S414.

Figure 5:
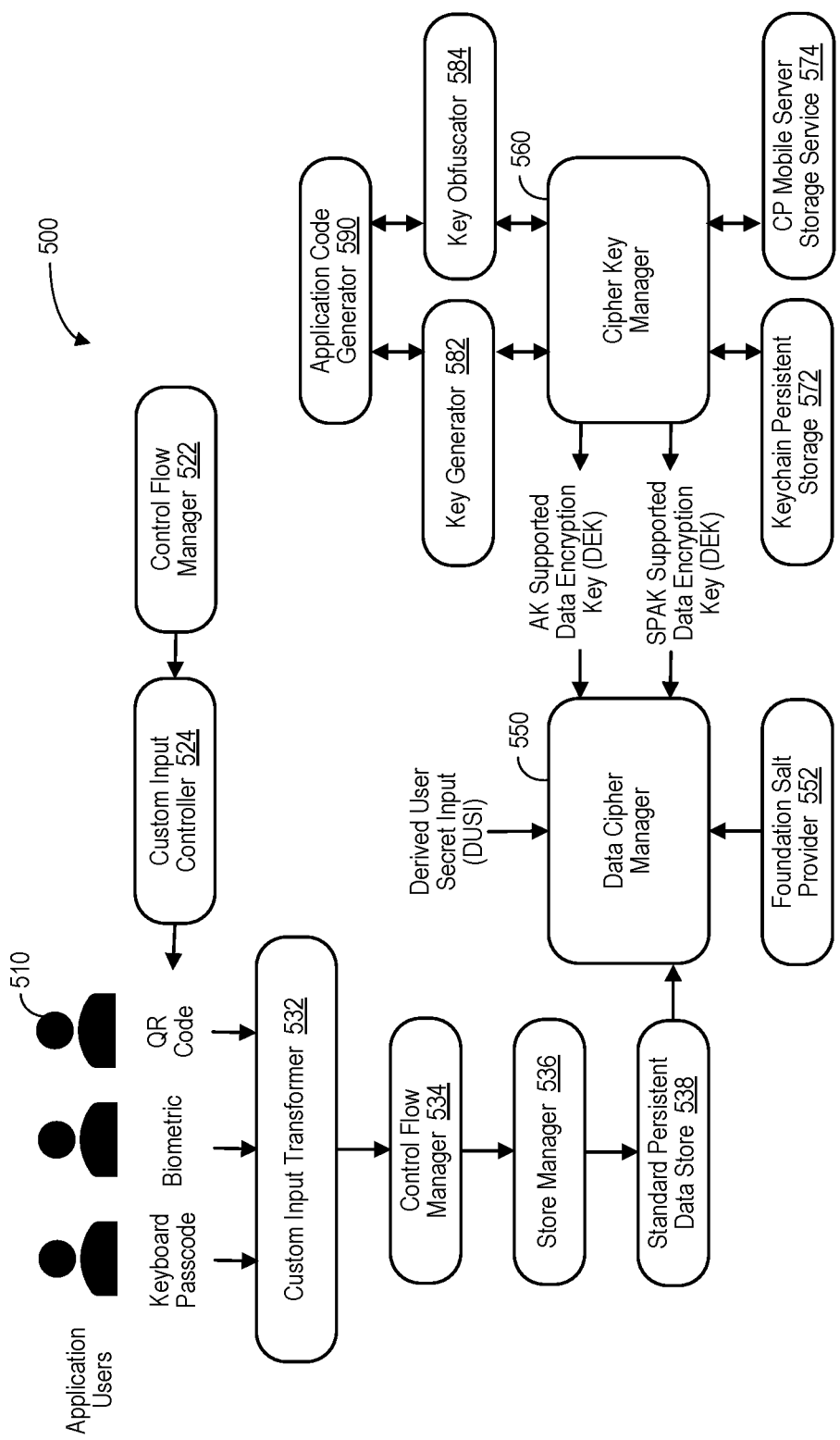
FIG. 5 is a secure, reliable, and decentralized communication system in accordance with some embodiments.

FIG. 5 is a SRDC system 500 in accordance with some embodiments. The components of the system 500 are used in accordance with any of the embodiments described herein. An application user 510 provides security information (e.g., passcode via a keyboard, biometric information, QR code, etc. in accordance with a control flow manager 522 and/or a custom input controller 524) to a custom input transformer 532. A control flow manager 534, store manager 536, and/or standard persistent data store 538 may then process the data before it is passed to a data cipher manager 550. The data cipher manager 550 also receives a Derived User Secret Input ("DUSI") and a random value from a foundation salt provider 552. A cipher key manager 560 exchanges data with keychain persistent storage 572, a Cloud Platform ("CP") mobile server storage service 574, and an application code generator 590 (via a key generator 582 and/or key obfuscator 584). As will be described, the cipher key manager 560 may then send an AK supported Data Encryption Key ("DEK") and a SPAC supported DEK to the data cipher manager 550.

Figure 6A:
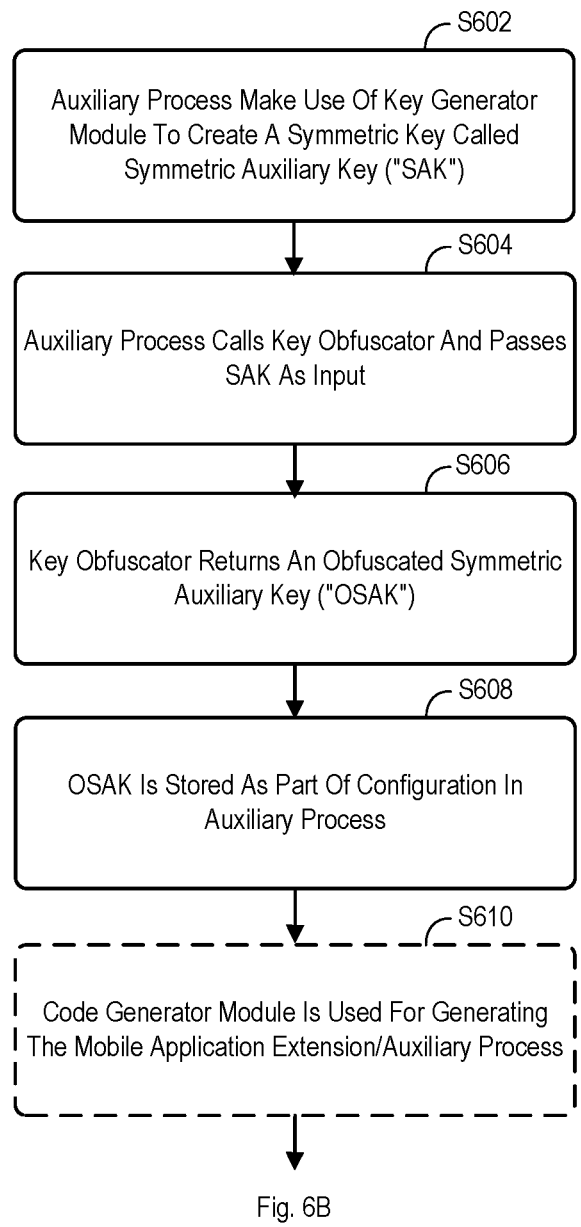
FIGS. 6A and 6B are a method for each auxiliary process to perform initialization according to some embodiments.
Figure 6B:
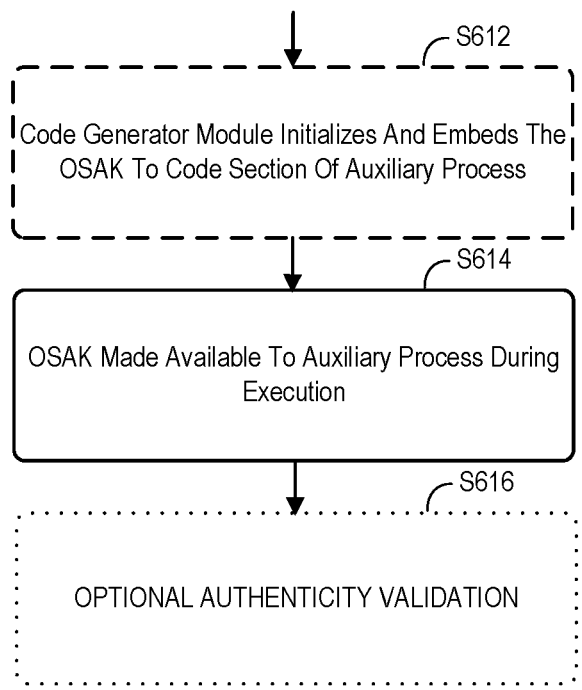

FIGS. 6A and 6B are a method for each auxiliary process to perform initialization according to some embodiments. In particular, in this method the SRDC executes actions associated with each of the auxiliary processes to perform the following initialization steps. At S602, an auxiliary process makes use of a key generator module to create a symmetric key called Symmetric Auxiliary Key ("SAK"). At S604, the auxiliary process calls the key obfuscator and passes the SAK generated in S602. At S606, the key obfuscator returns an Obfuscated Symmetric Auxiliary Key ("OSAK"). At S608, the OSAK is stored as part of a configuration in the auxiliary process.

In a different embodiment (as illustrated by dashed lines), a code generator module is used to generate the mobile application extension/auxiliary process at S610. In that embodiment, the code generator module initializes and embeds the OSAK to the code section of auxiliary process at S612. In both embodiments, the OSAK is made available to the auxiliary process during execution at S614. An optional authenticity validation process might also be performed at S616 (as illustrated by dotted lines and described in connection with FIGS. 11A and 11B).

Figure 7A:
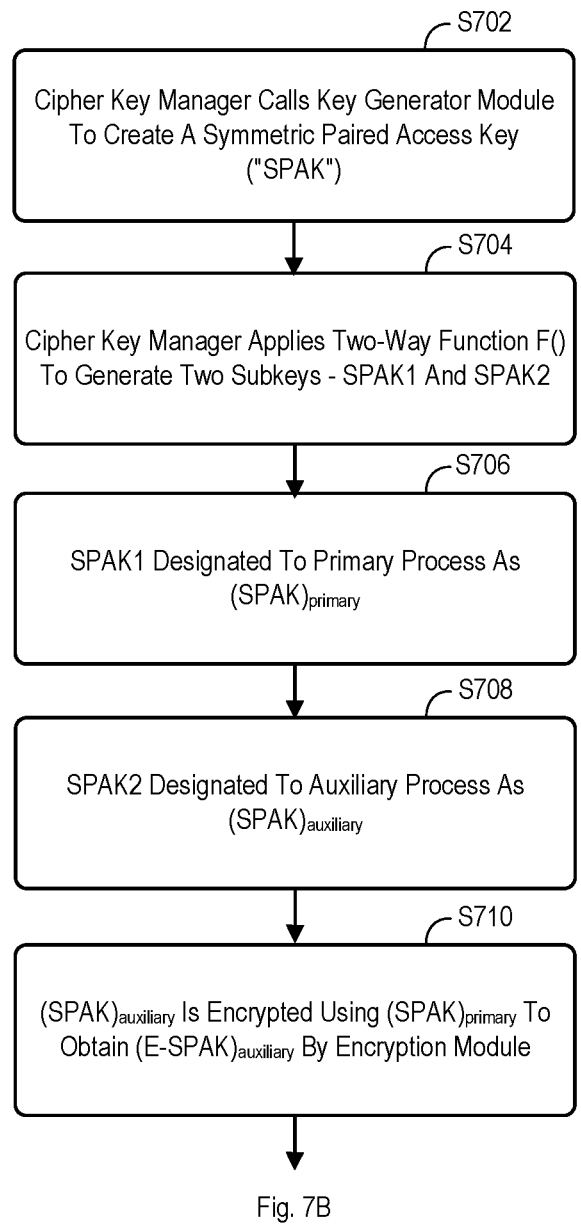
FIGS. 7A through 7C are a method to achieve a secure and reliable communication path between auxiliary processes and a primary process in accordance with some embodiments.
Figure 7B:
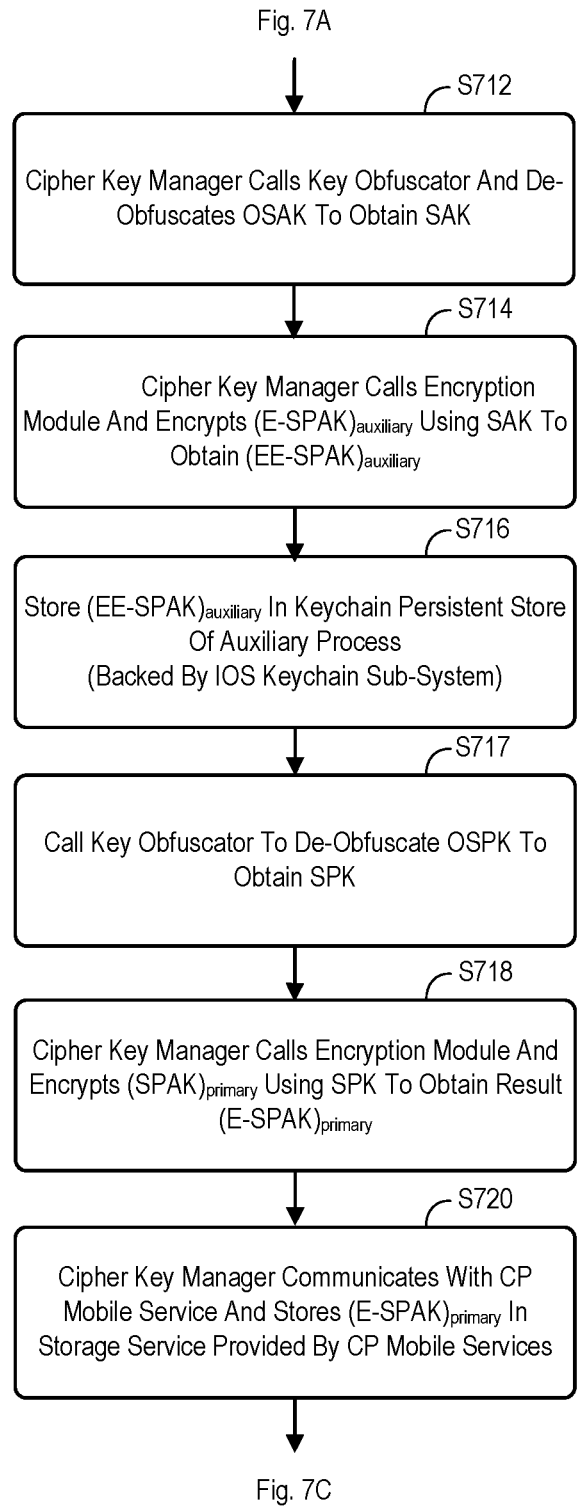
Figure 7C:
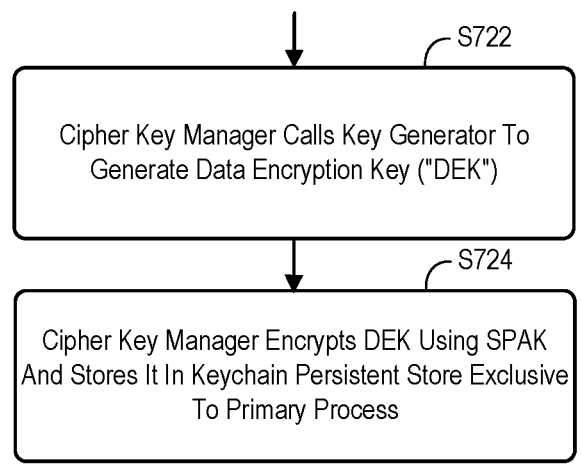

FIGS. 7A through 7C are a method to achieve a secure and reliable communication path between auxiliary processes and a primary process in accordance with some embodiments. Here, the SRDC system executes steps to achieve a secure and reliable communication path between the auxiliary process(es) and primary process. At S702, a cipher key manager calls the key generator module to create a Symmetric Paired Access Key ("SPAK"). At S704, the cipher key manager applies a two-way function f( ) (e.g., any KN threshold scheme), to generate two subkeys: SPAK1 and SPAK2. As used herein, "f( )" may be considered two-way in the sense that, given SPAK1 and SPAK2 it can re-generate SPAK.

At S706, SPAK1 is designated to the primary process as $(SPAK)_{primary}$. At S708, SPAK2 is designated to the auxiliary process as $(SPAK)_{auxiliary}$. At S710, $(SPAK)_{auxiliary}$ is encrypted using $(SPAK)_{primary}$ to obtain a result $(E-SPAK)_{auxiliary}$ by the encryption module. At S712, the cipher key manager calls the key obfuscator and de-obfuscates OSAK to obtain SAK. At S714, the cipher key manager calls the encryption module and encrypts $(E-SPAK)_{auxiliary}$ using SAK to obtain $(EE-SPAK)_{auxiliary}$.

At S716, the $(EE-SPAK)_{auxiliary}$ is stored in the keychain persistent store of the auxiliary process. As used herein, the phrase "keychain persistent store" may refer to a secure persistent store backed by an iOS keychain sub-system. At S717, the cipher key manager calls the key obfuscator and de-obfuscates OSPK to obtain SPK. At S718, the cipher key manager calls encryption module and encrypts $(SPAK)_{primary}$ using SPK to obtain the result $(E-SPAK)_{primary}$. The cipher key manager then communicates with the CP mobile service at S720 and stores $(E-SPAK)_{primary}$ in the storage service provided by the CP mobile services.

At S722, the cipher key manager calls the key generator to generate a Data Encryption Key ("DEK"). At S724, the cipher key manager encrypts DEK obtained from S722 using SPAK and stores it in the keychain persistent store exclusive to the primary process.

Figure 8A:
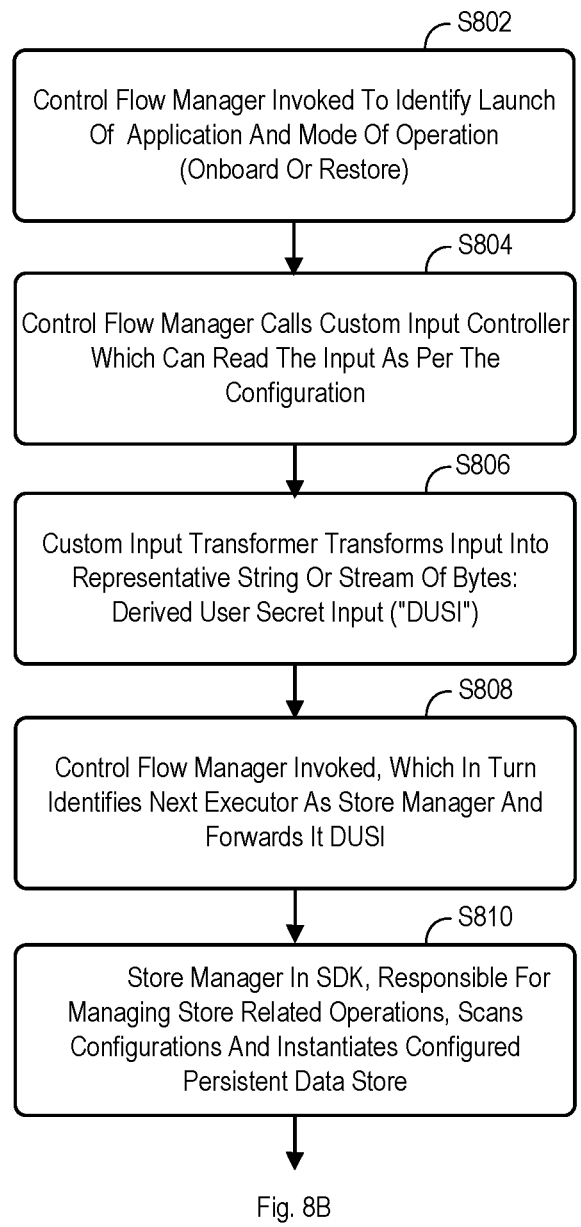
FIGS. 8A through 8C are a method performed when a mobile application is launched according to some embodiments.
Figure 8B:
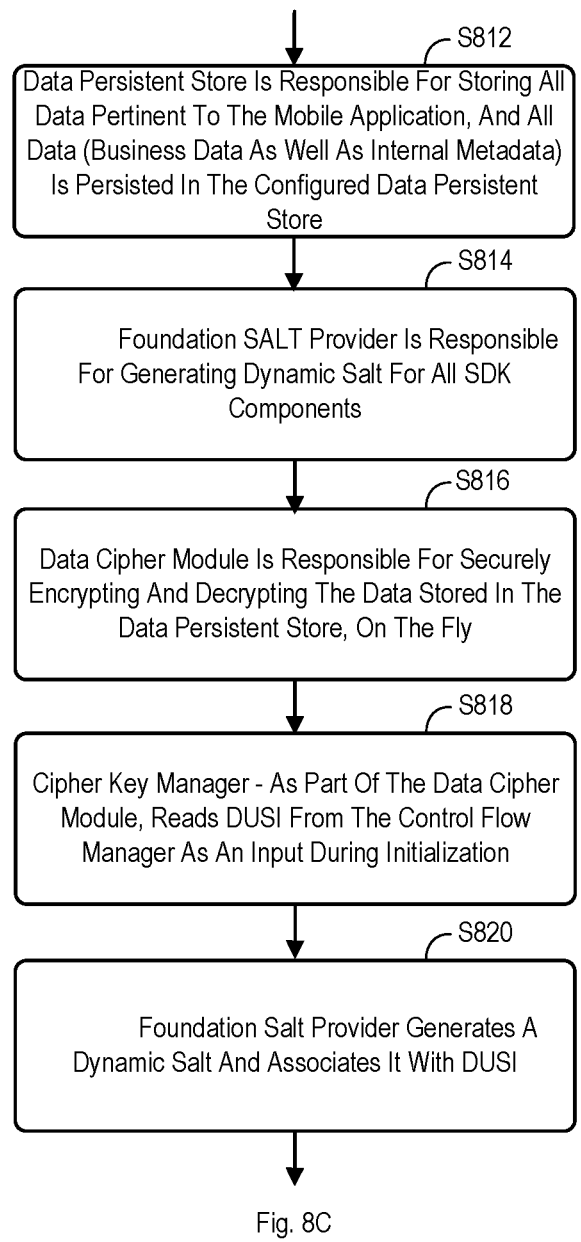
Figure 8C:
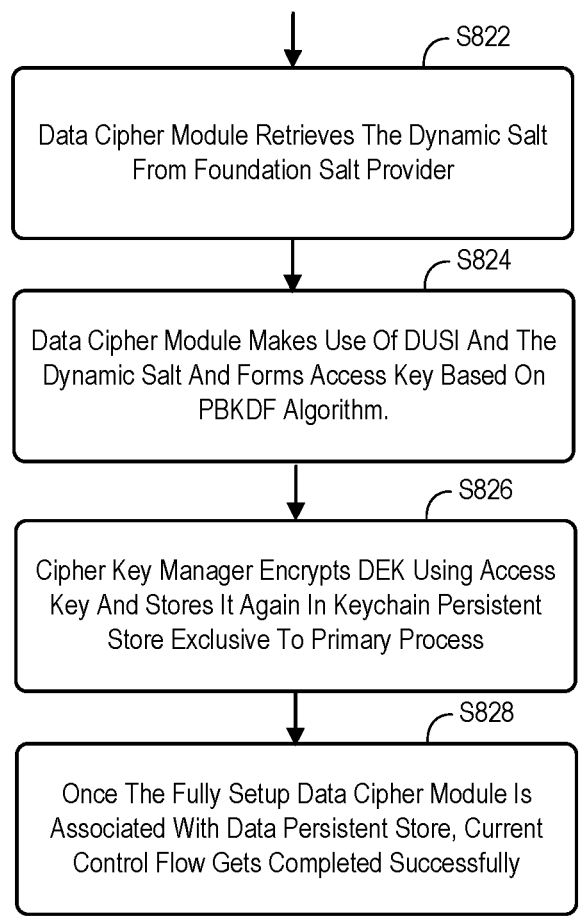

FIGS. 8A through 8C are a method performed when a mobile application is launched according to some embodiments. Whenever a mobile application is launched, in terms of data security, the SRDC system performs the following steps in parallel with the steps of FIGS. 7A through 7C. At S802, a control flow manager is invoked to identify the launch of the application and its mode of operation (e.g., onboard or restore). At S804, the control flow manager calls a custom input controller which can read the input as per the configuration. The SDK may make use of separate custom input controllers to process different input mechanisms, such as a keyboard passcode input, a QR code input, a biometric input, etc.

At S806, a custom input transformer transforms the input from S804 into a representative string or stream of bytes, referred to as DUSI. At S808, the control flow manager is invoked, which in turn identifies the next executor as the store manager and forwards the DUSI to it. The store manager in the SDK is responsible for managing store related operations. At S810, the store manager scans the configurations and instantiates the configured persistent data store. Note that the SDK may support different types of data persistent stores, such as a secure database store, a secure key value store, a file store, etc. (which can be used by application developers to store data).

The data persistent store may be responsible for storing all data pertinent to the mobile application. All data (business data as well as internal metadata) is persisted in the configured data persistent store. Whenever the application code needs to store some data, or the SDK needs to store any internal data, the configured data persistent store is used. During the initialization of the data persistent store, it may internally initialize the data cipher module at S812.

The foundation salt provider is a component that, at S814, prepares to generate dynamic salt for SDK components. A "salt" is a fixed-length cryptographically strong random value that is added to the input of certain cryptographic functions/one-way hash functions to create unique hashes for every input, where such inputs may or may not be unique in nature. Thus, the salt helps make such functions behave in a non-deterministic way. At S816, the data cipher module prepares to securely encrypt/decrypt data stored in the data persistent store (on the fly).

At S818, the cipher key manager, as part of the data cipher module, reads DUSI from the control flow manager as an input during initialization. At S820, the foundation salt provider generates a dynamic salt and associates it with the DUSI from S820. At S822, the data cipher module retrieves the dynamic salt from the foundation salt provider. At S824, the data cipher module makes use of DUSI and the dynamic salt to form an Access Key based on a Password-Based Key Derivation Function ("PBKDF") algorithm. At S826, the cipher key manager encrypts the DEK, this time using Access Key from the S824, and stores it again in the keychain persistent store exclusive to the primary process. Once the fully setup data cipher module is associated with the data persistent store, the current control flow gets completed successfully at S828.

Figure 9A:
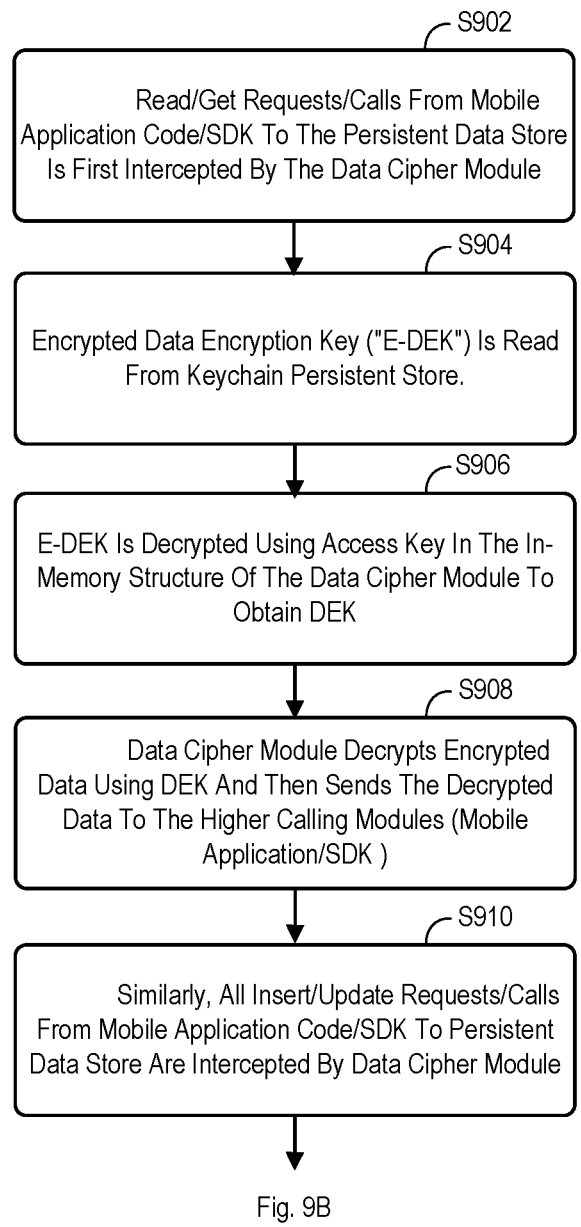
FIGS. 9A and 9B are a data security control plane method in a primary process in accordance with some embodiments.
Figure 9B:
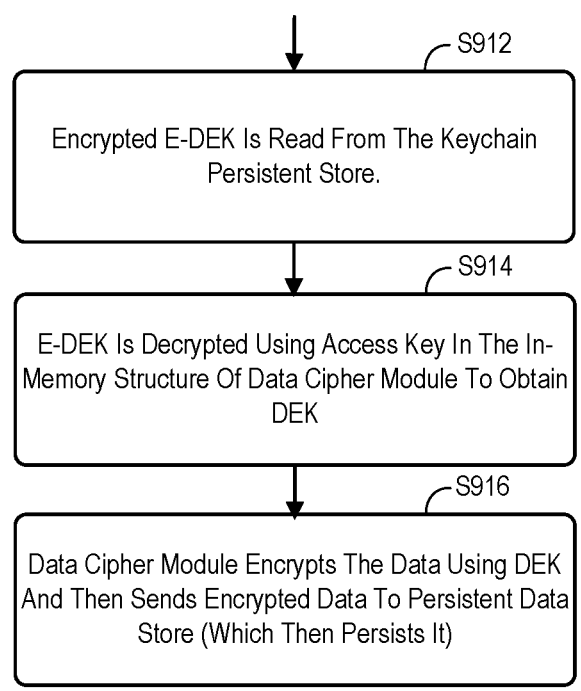

FIGS. 9A and 9B are a data security control plane method in a primary process in accordance with some embodiments. At any point in time, all read/get requests/calls from the mobile application code/SDK to the Persistent Data Store is intercepted at S902 by the data cipher module, after data persistent store reads the data. At S904, an encrypted DEK ("E-DEK") is read from the keychain persistent store. At S906, the E-DEK is decrypted using Access Key in the in-memory structure of the data cipher module to obtain DEK. At S908, the data cipher module then decrypts the encrypted data obtained earlier step using DEK formed from S906 and then sends the decrypted data to the higher calling modules (mobile application/SDK).

Similarly, all insert/update requests/calls from the mobile application code/SDK to the Persistent Data Store is intercepted at S910 by the data cipher module. At S912, an encrypted E-DEK is read from the keychain persistent store. At S914, the E-DEK is decrypted using Access Key in the in-memory structure of data cipher module to obtain DEK. At S916, the data cipher module then encrypts the data using the DEK formed from S914 and then sends the encrypted data to the persistent data store (which then persists it).

Figure 10A:
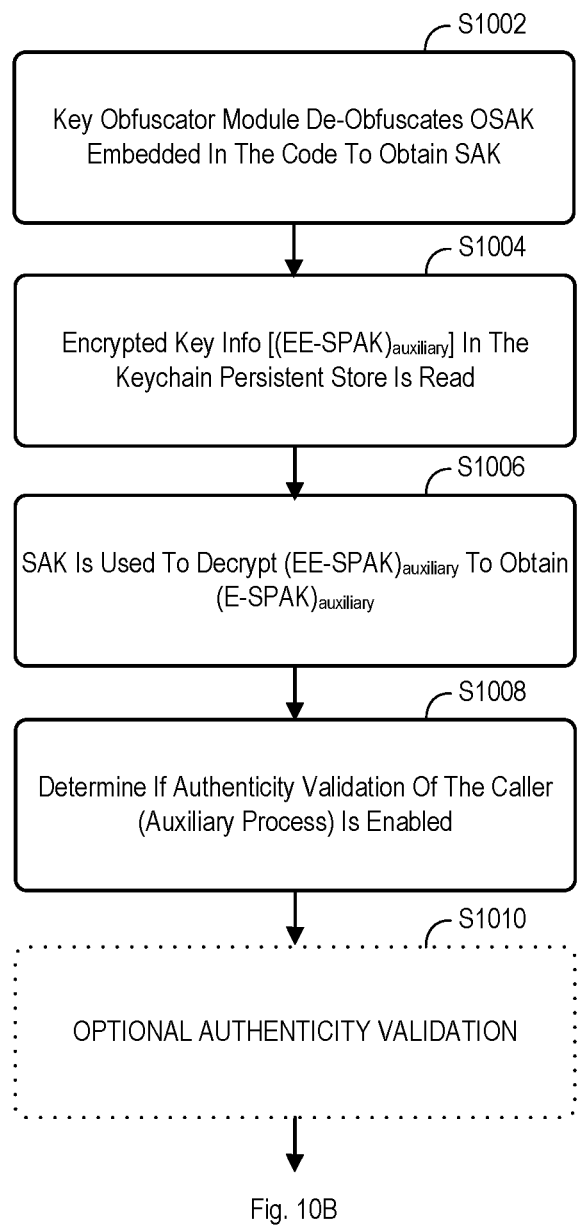
FIGS. 10A through 10C are a method performed when an auxiliary process needs to communicate with a primary process according to some embodiments.
Figure 10B:
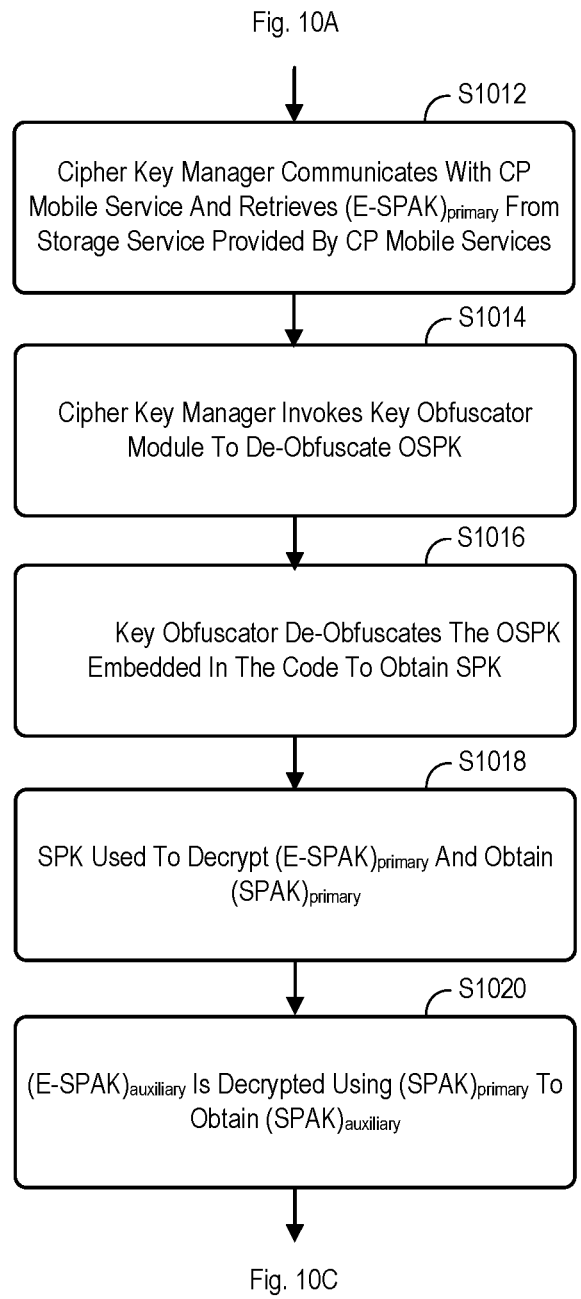
Figure 10C:
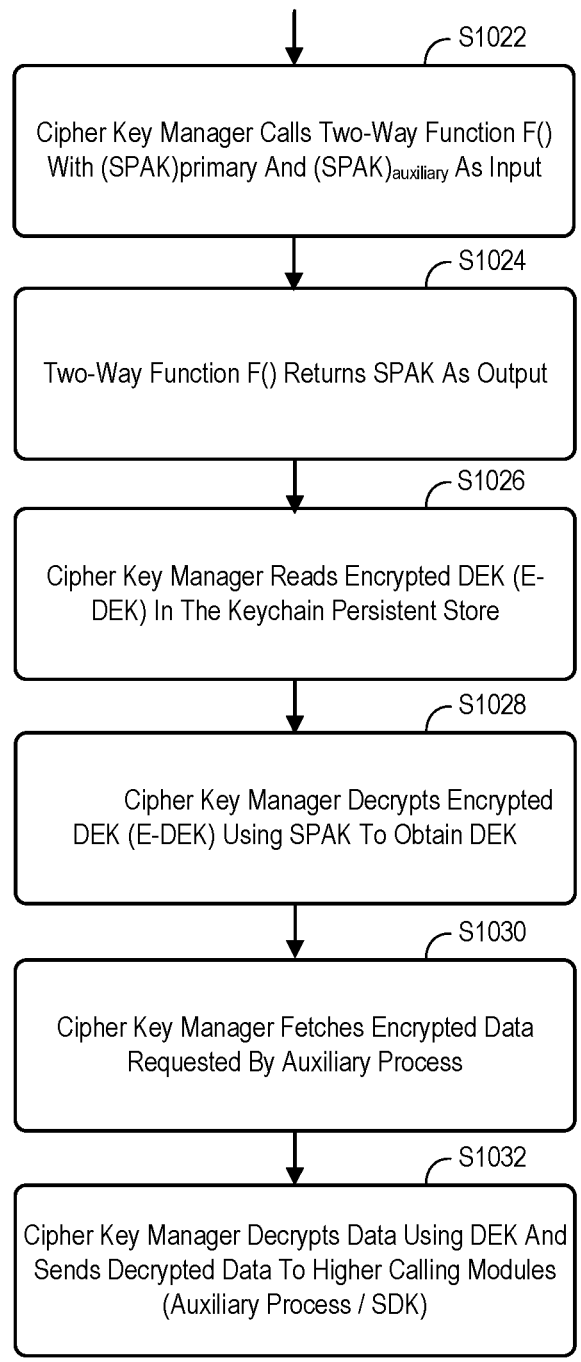

FIGS. 10A through 10C are a method performed when an auxiliary process needs to communicate with a primary process according to some embodiments. At S1002, the key obfuscator module de-obfuscates OSAK embedded in the code to obtain SAK. At S1004, encrypted key info [(EE-SPAK)$_{auxiliary}$] in the keychain persistent store is read. At S1006, In the next step, SAK from S1002 is used to decrypt (EE-SPAK)$_{auxiliary}$ to obtain (E-SPAK)$_{auxiliary}$. At S1008, the system determines if authenticity validation of the caller (auxiliary process) is enabled. If so, an optional authentication validation process is performed at S1010 (as illustrated by a dotted line and described in connection with FIGS. 12A through 12C).

At S1012, the cipher key manager communicates with the CP mobile service and retrieves (E-SPAK)$_{primary}$ from the storage service provided by the CP mobile services. At S1014, the cipher key manager invokes the key obfuscator module to de-obfuscate OSPK. At S1016, the key obfuscator de-obfuscates the OSPK embedded in the code to obtain SPK. At S1018, the SPK obtained at S1016 is used to decrypt (E-SPAK)$_{primary}$ to obtain (SPAK)$_{primary}$.

At S1020, (E-SPAK)$_{auxiliary}$ is decrypted using (SPAK)$_{primary}$ to obtain (SPAK)$_{auxiliary}$. At S1022, the cipher key manager calls the two-way function f( ) with (SPAK)$_{primary}$ and (SPAK)$_{auxiliary}$ as inputs. At S1024, the two-way function f( ) returns SPAK as output. At S1026, the cipher key manager reads encrypted DEK (E-DEK) in the keychain persistent store. At S1028, the cipher key manager decrypts the encrypted DEK (E-DEK) using SPAK to obtain DEK. At S1030, the cipher key manager fetches the encrypted data requested by the auxiliary process. At S1032, the cipher key manager decrypts the data from S1030 using DEK and then sends the decrypted data to the higher calling modules (auxiliary process/SDK).

Figure 11A:
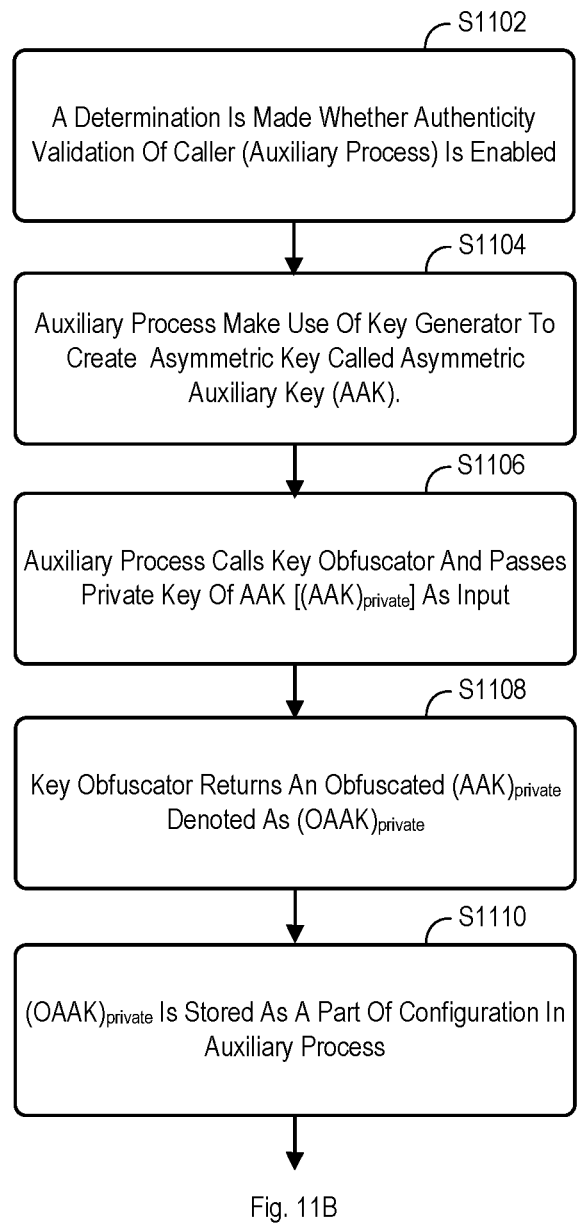
FIGS. 11A and 11B are an auxiliary process authenticity validation method in accordance with some embodiments.
Figure 11B:
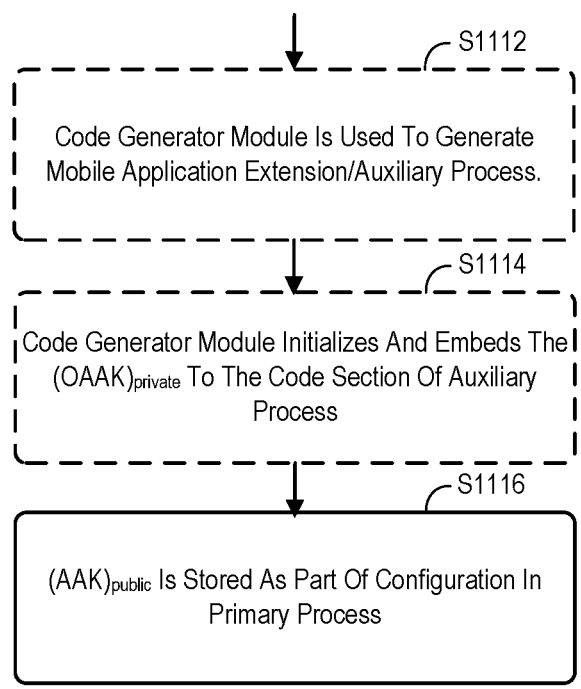

FIGS. 11A and 11B are an auxiliary process authenticity validation method in accordance with some embodiments (e.g., performed at S616). Here, the SRDC system performs necessary steps to validate the authenticity of the auxiliary process(es) that communicates with the primary process. At S1102, a determination is made whether authenticity validation of the caller (auxiliary process) is enabled or not. At S1104, if authenticity validation is enabled, then auxiliary process makes use of key generator to create an asymmetric key called Asymmetric Auxiliary Key ("AAK"). At S1106, the auxiliary process calls the key obfuscator and passes private key of AAK [(AAK)$_{private}$] generated from S1104 as input. At S1108, the key obfuscator returns an Obfuscated (AAK)$_{private}$ denoted as (OAAK)$_{private}$. At S1110, (OAAK)$_{private}$ is stored as a part of a configuration in the auxiliary process.

In a different embodiment (illustrated by a dashed line), at S1112 a code generator module generates the mobile application extension/auxiliary process. In that embodiment, at S1114 the code generator module initializes and embeds the (OAAK)$_{private}$ to the code section of auxiliary process. At S1116, (AAK)$_{public}$ can then be stored as a part of a configuration in the primary process.

Figure 12A:
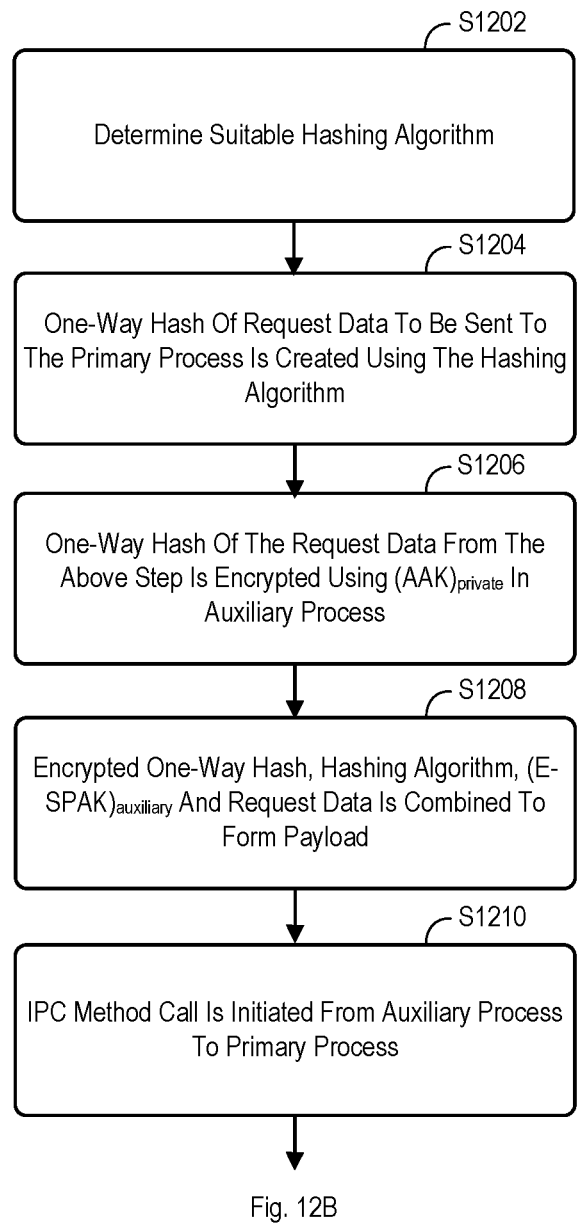
FIGS. 12A through 12C are an authenticity validation of a caller method according to some embodiments.
Figure 12B:
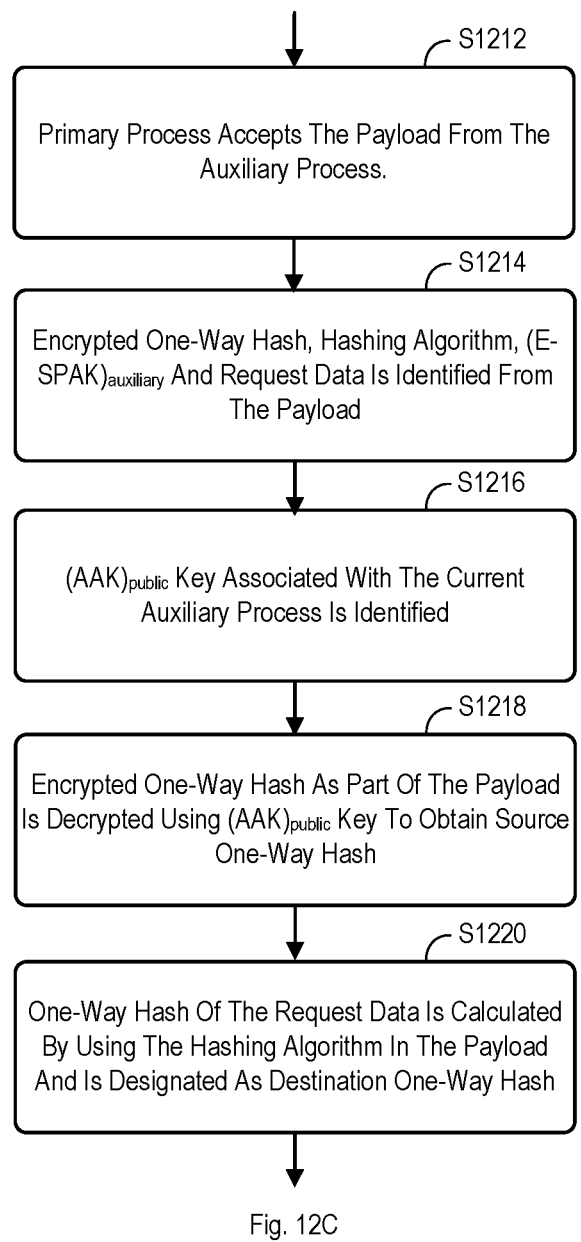
Figure 12C:
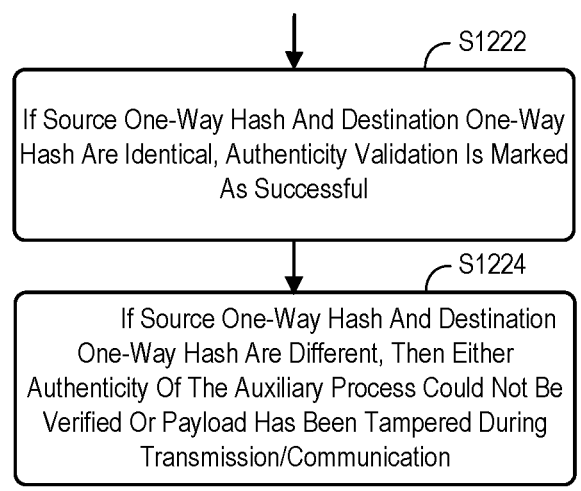

FIGS. 12A through 12C are an authenticity validation of a caller method according to some embodiments (e.g., performed at S1010). At S1202, a determination of a suitable hashing algorithm is performed. At S1204, a one-way hash of the request data to be sent to the primary process is created using the hashing algorithm from S1202. At S1206, the one-way hash of the request data from S1204 is encrypted using (AAK)$_{private}$ in the auxiliary process. At S1208, the encrypted one-way hash, hashing algorithm, (E-SPAK)$_{auxiliary}$ and request data are combined to form a payload. At S1210, an Inter-Process Communication ("IPC") method call is initiated from the auxiliary process to primary process. At S1212, the primary process accepts the payload from the auxiliary process. At S1214, the encrypted one-way hash, hashing algorithm, (E-SPAK)$_{auxiliary}$ and request data are identified from the payload. At S1216, the (AAK)$_{public}$ key associated with the current auxiliary process is identified. At S1218, the encrypted one-way hash as part of the payload is decrypted using (AAK)$_{public}$ key, to obtain source one-way hash. At S1220, a one-way hash of the request data is calculated using the hashing algorithm in the payload and is designated as destination one-way hash. At S1222, if the source one-way hash and destination one-way hash are deemed to be identical, then authenticity validation is marked as successful. At S1224, if source one-way hash and destination one-way hash are deemed to be different, then SRDC system makes an inference that either (i) the authenticity of the auxiliary process could not be verified or (ii) the payload was tampered with during transmission/communication. In this case, the SRDC system stops processing the current request and auxiliary process(es) may choose to re-initiate or retry the request at a later point in time.

Thus, embodiments may help ensure that even when a persistent keychain store is compromised, keys will remain secure in the system. Moreover, the modules in the SRDC system help make sure that embedded keys cannot be reverse-engineered because they are stored in an obfuscated manner. Even if the key obfuscator gets compromised in some highly improbable manner, the multi-layer encryption methods makes it impossible to retrieve the DEK from the system. In addition, the SRDC system provides a secure way to encrypt the user data and at the same time provides a novel way to access it from the auxiliary processes. The unique approach to managing keys helps ensure that the DEK will not be exposed even if the underlying persistent store in the Operating System ("OS") is compromised due to any OS vulnerabilities. Further, the SRDC system makes it impossible to retrieve data even from jail-broken devices.

Figure 13:
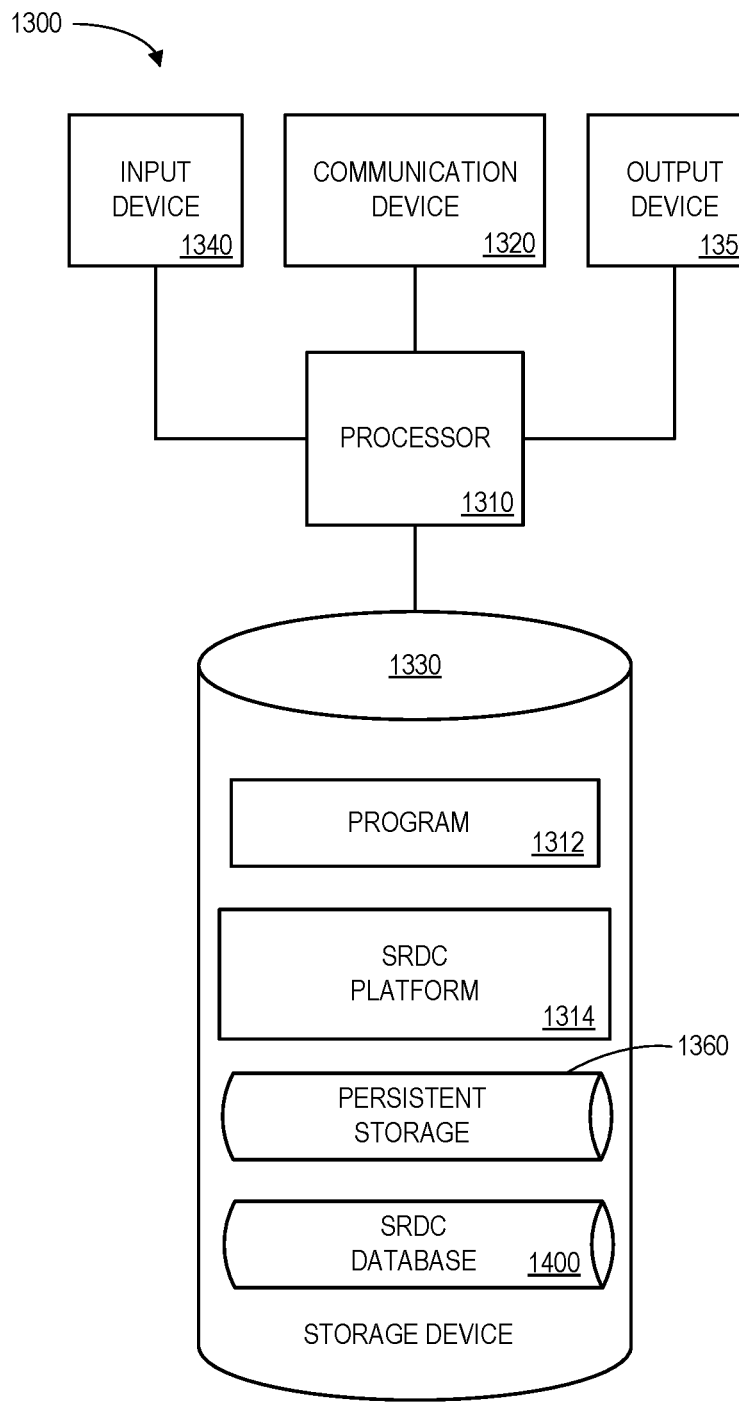
FIG. 13 is an apparatus or platform according to some embodiments.

Note that the embodiments described herein may be implemented using any number of different hardware configurations. For example, FIG. 13 is a block diagram of an apparatus or platform 1300 that may be, for example, associated with the system 200 of FIG. 2 (and/or any other system described herein). The platform 1300 comprises a processor 1310, such as one or more commercially available CPUs in the form of one-chip microprocessors, coupled to a communication device 1360 configured to communicate via a communication network (not shown in FIG. 13). The communication device 1360 may be used to communicate, for example, with one or more remote user platforms, cloud resource providers, etc. The platform 1300 further includes an input device 1340 (e.g., a computer mouse and/or keyboard to input rules or logic) and/an output device 1350 (e.g., a computer monitor to render a display, transmit recommendations, and/or create reports). According to some embodiments, a mobile device and/or PC may be used to exchange information with the platform 1300.

The processor 1310 also communicates with a storage device 1330. The storage device 1330 can be implemented as a single database or the different components of the storage device 1330 can be distributed using multiple databases (that is, different deployment information storage options are possible). The storage device 1330 may comprise any appropriate information storage device, including combinations of magnetic storage devices (e.g., a hard disk drive), optical storage devices, mobile telephones, and/or semiconductor memory devices. The storage device 1330 stores a program 1312 and/or SRDC platform 1314 for controlling the processor 1310. The processor 1310 performs instructions of the programs 1312, 1314, and thereby operates in accordance with any of the embodiments described herein.

The programs 1312, 1314 may be stored in a compressed, uncompiled and/or encrypted format. The programs 1312, 1314 may furthermore include other program elements, such as an operating system, clipboard application, a database management system, and/or device drivers used by the processor 1310 to interface with peripheral devices.

As used herein, information may be "received" by or "transmitted" to, for example: (i) the platform 1300 from another device; or (ii) a software application or module within the platform 1300 from another software application, module, or any other source.

In some embodiments (such as the one shown in FIG. 13), the storage device 1330 further stores persistent storage 1360 and a SRDC database 1400. An example of a database that may be used in connection with the platform 1300 will now be described in detail with respect to FIG. 14. Note that the database described herein is only one example, and additional and/or different information may be stored therein. Moreover, various databases might be split or combined in accordance with any of the embodiments described herein.

Referring to FIG. 14, a table is shown that represents the SRDC database 1400 that may be stored at the platform 1300 according to some embodiments. The table may include, for example, entries associated with SRDC systems. The table may also define fields 1402, 1404, 1406, 1408, for each of the entries. The fields 1402, 1404, 1406, 1408 may, according to some embodiments, specify: a SRDC identifier 1402, a mobile application identifier 1404, a primary process identifier 1406, and an auxiliary process identifier 1408. The SRDC database 1400 may be created and updated, for example, when a user application is launched and/or communication between a primary and auxiliary process is needed.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 15:
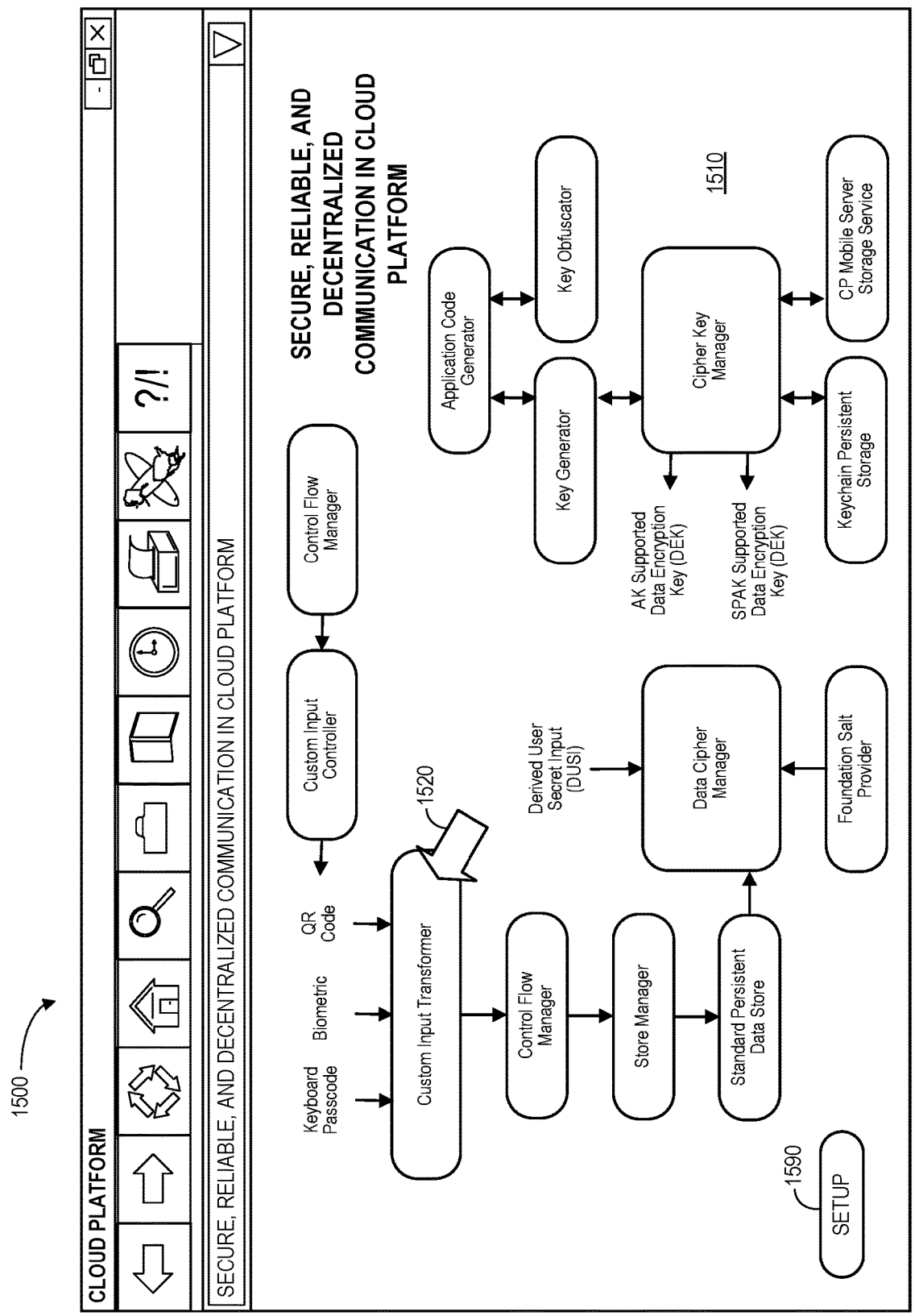
FIG. 15 is a SRCD display according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented. For example, FIG. 15 is a human machine interface display 1500 according to some embodiments. The display 1500 includes a graphical representation 1510 of elements of SRDC system. Selection of an element (e.g., via a touchscreen or computer pointer 1520) may result in display of a pop-up window containing various options (e.g., to adjust rules or logic, assign various machine or devices, etc.). The display 1500 may also include a user-selectable "Setup" icon 1590 (e.g., to configure parameters to alter or adjust processes as described with respect any of the embodiments described herein).

A novel approach for SRDC between a mobile application process and other extended mobile application processes is described. SRDC provides advantages to the system which otherwise are not present in other frameworks. SRDC provides a secure way to access encrypted data for a mobile application primary process as well as mobile application extension auxiliary processes.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. An apparatus associated with secure, reliable, and decentralized communications for a mobile application, comprising:
   a Secure, Reliable, and Decentralized Communication ("SRDC") system, including:
      a computer processor, and
      a memory storage device including instructions that, when executed by the computer processor, enable the SRDC system to:
         (i) initialize a primary process associated with the mobile application, including creation of an Obfuscated Symmetric Primary Key ("OSPK"),
         (ii) initialize an auxiliary process associated with the mobile application, including creation of an Obfuscated Symmetric Auxiliary Key ("OSAK"),
         (iii) call by a cipher key manager, a key generator module to create a Symmetric Paired Access Key ("SPAK"),
         (iv) apply, by the cipher key manager, a two-way function f( ) to generate two subkeys: SPAK1 and SPAK2,
         (v) designate SPAK1 to the primary process as $(SPAK)_{primary}$,
         (vi) designate SPAK2 to the auxiliary process as $(SPAK)_{auxiliary}$,
         (vii) encrypt, by an encryption module, $(SPAK)_{auxiliary}$ using $(SPAK)_{primary}$ to obtain a result $(E\text{-}SPAK)_{auxiliary}$,
         (viii) call, by the cipher key manager, a key obfuscator to de-obfuscate OSAK to obtain Symmetric Auxiliary Key ("SAK"),
         (ix) call, by the cipher key manager, the encryption module and encrypt $(E\text{-}SPAK)_{auxiliary}$ using SAK to obtain $(EE\text{-}SPAK)_{auxiliary}$, (x) store the (EE-SPAK)$_{auxiliary}$ in a keychain persistent store of the auxiliary process, (xi) call, by the cipher key manager, the key obfuscator to de-obfuscate OSPK to obtain a Symmetric Primary Key ("SPK"), (xii) call, by the cipher key manager, the encryption module and encrypt (SPAK)$_{primary}$ using SPK to obtain a result (E-SPAK)$_{primary}$, (xiii) communicate, by the cipher key manager, with a Cloud Platform ("CP") mobile service and store (E-SPAK)$_{primary}$ in a storage service provided by the CP mobile service, (xiv) call, by the cipher key manager, the key generator to generate a Data Encryption Key ("DEK"), and (xv) encrypt, by the cipher key manager, DEK obtained using SPAK and store an encrypted DEK in the keychain persistent store exclusive to the primary process.

2. The apparatus of claim 1, wherein the initialization of the primary process comprises:
using the key generator module in SDK to create a Symmetric Primary Key ("SPK")
calling the key obfuscator using SPK as an input;
receiving, from the key obfuscator, the Obfuscated SPK ("OSPK"); and
storing the OSPK as part of a configuration in the primary process.

3. The apparatus of claim 1, wherein the initialization of the auxiliary process comprises:
using the key generator module to create a Symmetric Auxiliary Key ("SAK");
calling the key obfuscator and using SAK as an input;
receiving, from the key obfuscator the Obfuscated Symmetric Auxiliary Key ("OSAK"); and
storing the OSAK as part of a configuration in the auxiliary process.

4. The system of claim 3, wherein the initialization of the auxiliary process further includes authenticity validation, comprising:
determining that authenticity validation of the caller auxiliary process is enabled;
if authenticity validation is enabled, then using key generator to create an asymmetric key called Asymmetric Auxiliary Key ("AAK");
calling the key obfuscator and passing private key of AAK [(AAK)$_{private}$] as input;
returning, by the key obfuscator, an Obfuscated (AAK)$_{private}$ denoted as (OAAK)$_{private}$; and
storing (OAAK)$_{private}$ as a part of a configuration in the auxiliary process.

5. The apparatus of claim 1, wherein the SRDC system, upon launch of the mobile application, performs the following:
invoking a control flow manager to identify the launch of the mobile application;
calling, by the control flow manager, a custom input controller which can read a user input;
transforming, by a custom input transformer, the user input into a Derived User Secret Input ("DUSI");
reading, by the cipher key manager, the DUSI;
receiving, by a cipher key manager, a dynamic salt;
using, by the data cipher module, the DUSI and the dynamic salt to form an access key based on a Password-Based Key Derivation Function ("PBKDF"); and
encrypting, by the cipher key manager, the DEK using the access key and storing it in the keychain persistent store exclusive to the primary process.

6. The apparatus of claim 5, wherein the mobile application launch is associated with one of an onboarding process and a restore process.

7. The apparatus of claim 5, wherein the user input is associated with at least one of: (i) a keyboard passcode input, (ii) a Quick Response ("QR") code input, and (iii) a biometric input.

8. The apparatus of claim 5, wherein the SRDC system, upon interception of a read/get request/call from the mobile application code/SDK to a persistent data store, performs the following:
reading an encrypted DEK ("E-DEK") from the keychain persistent store;
decrypting the E-DEK using the access key in the in-memory structure of the data cipher module to obtain the DEK; and
decrypting, by the data cipher module, the encrypted data using DEK and sending the decrypted data to higher calling modules.

9. The apparatus of claim 8, wherein the SRDC system, upon interception of an insert/update request/call from the mobile application code/SDK to the persistent data store, performs the following:
reading the encrypted E-DEK from the keychain persistent store;
decrypting the E-DEK using the access key in the in-memory structure of data cipher module to obtain the DEK;
encrypting, by the data cipher module, the data using the DEK and then sending the encrypted data to the persistent data store.

10. The apparatus of claim 9, wherein the SRDC system, when an auxiliary process needs to communicate with the primary process, performs the following:
de-obfuscating, by the key obfuscator, OSAK embedded in the code to obtain SAK;
reading encrypted key info [(EE-SPAK)$_{auxiliary}$] in the keychain persistent store;
using SAK to decrypt (EE-SPAK)$_{auxiliary}$ to obtain (E-SPAK)$_{auxiliary}$;
communicating, by the cipher key manager, with the CP mobile service and retrieving (E-SPAK)$_{primary}$ from the storage service provided by the CP mobile service;
invoking, by the cipher key manager, the key obfuscator to de-obfuscate OSPK to obtain SPK;
using SPK to decrypt (E-SPAK)$_{primary}$ to obtain (SPAK)$_{primary}$;
decrypting (E-SPAK)$_{auxiliary}$ using (SPAK)$_{primary}$ to obtain (SPAK)$_{auxiliary}$;
calling, by the cipher key manager, the two-way function f( ) with (SPAK)$_{primary}$ and (SPAK)$_{auxiliary}$ as inputs;
receiving, from the two-way function f( ), SPAK as output;
reading, by the cipher key manager, the encrypted DEK (E-DEK) in the keychain persistent store;
decrypting, by the cipher key manager, the E-DEK using SPAK to obtain DEK;
fetching, by the cipher key manager, the encrypted data requested by the auxiliary process; and
decrypting, by the cipher key manager, the data using DEK and sending the decrypted data to the higher calling modules.

11. The apparatus of claim 10, wherein the SRDC further performs authenticity validation after using SAK to decrypt (EE-SPAK)$_{auxiliary}$ to obtain (E-SPAK)$_{auxiliary}$, comprising:
 determining that a suitable hashing algorithm is to be performed;
 creating a one-way hash of request data, to be sent to the primary process, using the suitable hashing algorithm;
 encrypting the one-way hash of the request data using (AAK)$_{private}$ in the auxiliary process;
 combining the encrypted one-way hash, hashing algorithm, (E-SPAK)$_{auxiliary}$ and request data to form a payload;
 initiating an Inter-Process Communication ("IPC") method call from the auxiliary process to the primary process;
 accepting, by the primary process, the payload from the auxiliary process;
 identifying the encrypted one-way hash, hashing algorithm, (E-SPAK)$_{auxiliary}$ and request data in the payload;
 identifying the (AAK)$_{public}$ key associated with the current auxiliary process;
 decrypting the encrypted one-way hash as part of the payload, using (AAK)$_{public}$ key, to obtain source one-way hash;
 calculating a one-way hash of the request data using the hashing algorithm in the payload and designating it as the destination one-way hash;
 if the source one-way hash and the destination one-way hash are identical, marking the authenticity validation as successful; and
 if the source one-way hash and the destination one-way hash are different, stopping a current request.

12. The apparatus of claim 10, wherein the primary process is associated with a containing application and the auxiliary process is associated with an application extension.

13. A computer-implemented method associated with secure, reliable, and decentralized communications for a mobile application, comprising:
 initializing, by a Secure, Reliable, and Decentralized Communication ("SRDC") system, a primary process associated with the mobile application, including creation of an Obfuscated Symmetric Primary Key ("OSPK");
 initializing an auxiliary process associated with the mobile application, including creation of an Obfuscated Symmetric Auxiliary Key ("OSAK");
 calling by a cipher key manager, a key generator module to create a Symmetric Paired Access Key ("SPAK");
 applying, by the cipher key manager, a two-way function f( ) to generate two subkeys: SPAK1 and SPAK2;
 designating SPAK1 to the primary process as (SPAK)$_{primary}$;
 designating SPAK2 to the auxiliary process as (SPAK)$_{auxiliary}$;
 encrypting, by an encryption module, (SPAK)$_{auxiliary}$ using (SPAK)$_{primary}$ to obtain a result (E-SPAK)$_{auxiliary}$;
 calling, by the cipher key manager, a key obfuscator to de-obfuscate OSAK to obtain Symmetric Auxiliary Key ("SAK");
 calling, by the cipher key manager, the encryption module and encrypt (E-SPAK)$_{auxiliary}$ using SAK to obtain (EE-SPAK)$_{auxiliary}$;
 storing the (EE-SPAK)$_{auxiliary}$ in the keychain persistent store of the auxiliary process;
 calling, by the cipher key manager, the key obfuscator to de-obfuscate OSPK to obtain a Symmetric Primary Key ("SPK");
 calling, by the cipher key manager, the encryption module and encrypt (SPAK)$_{primary}$ using SPK to obtain a result (E-SPAK)$_{primary}$;
 communicating, by the cipher key manager, with a Cloud Platform ("CP") mobile service and store (E-SPAK)$_{primary}$ in a storage service provided by the CP mobile service;
 calling, by the cipher key manager, the key generator to generate a Data Encryption Key ("DEK"); and
 encrypting, by the cipher key manager, DEK obtained using SPAK and storing an encrypted DEK in the keychain persistent store exclusive to the primary process.

14. The method of claim 13, wherein the initialization of the primary process comprises:
 using the key generator module in SDK to create a Symmetric Primary Key ("SPK")
 calling the key obfuscator using SPK as an input;
 receiving, from the key obfuscator, the Obfuscated SPK ("OSPK"); and
 storing the OSPK as part of a configuration in the primary process.

15. The method of claim 13, wherein the initialization of the auxiliary process comprises:
 using the key generator module to create a Symmetric Auxiliary Key ("SAK");
 calling the key obfuscator and using SAK as an input;
 receiving, from the key obfuscator the Obfuscated Symmetric Auxiliary Key ("OSAK"); and
 storing the OSAK as part of a configuration in the auxiliary process.

16. The method of claim 13, wherein the SRDC system, upon launch of the mobile application, performs the following:
 invoking a control flow manager to identify the launch of the mobile application;
 calling, by the control flow manager, a custom input controller which can read a user input;
 transforming, by a custom input transformer, the user input into a Derived User Secret Input ("DUSI");
 reading, by the cipher key manager, the DUSI;
 receiving, by the cipher key manager, a dynamic salt;
 using, by the data cipher module, the DUSI and the dynamic salt to form an access key based on a Password-Based Key Derivation Function ("PBKDF"); and
 encrypting, by the cipher key manager, the DEK using the access key and storing it in the keychain persistent store exclusive to the primary process.

17. The method of claim 16, wherein the mobile application launch is associated with one of an onboarding process and a restore process.

18. The method of claim 16, wherein the user input is associated with at least one of: (i) a keyboard passcode input, (ii) a Quick Response ("QR") code input, and (iii) a biometric input.

19. The method of claim 16, wherein the SRDC system, upon interception of a read/get request/call from the mobile application code/SDK to a persistent data store, performs the following:
 reading an encrypted DEK ("E-DEK") from the keychain persistent store;
 decrypting the E-DEK using the access key in the in-memory structure of the data cipher module to obtain the DEK;

decrypting, by the data cipher module, the encrypted data using DEK and sending the decrypted data to higher calling modules.

20. The method of claim 19, wherein the SRDC system, upon interception of an insert/update request/call from the mobile application code/SDK to the persistent data store, performs the following:
   reading the encrypted E-DEK from the keychain persistent store;
   decrypting the E-DEK using the access key in the in-memory structure of data cipher module to obtain the DEK;
   encrypting, by the data cipher module, the data using the DEK and then sending the encrypted data to the persistent data store.

21. The method of claim 20, wherein the SRDC system, when an auxiliary process needs to communicate with a primary process, performs the following:
   de-obfuscating, by the key obfuscator, OSAK embedded in the code to obtain SAK;
   reading encrypted key info [(EE-SPAK)$_{auxiliary}$] in the keychain persistent store;
   using SAK to decrypt (EE-SPAK)$_{auxiliary}$ to obtain (E-SPAK)$_{auxiliary}$;
   communicating, by the cipher key manager, with the CP mobile service and retrieving (E-SPAK)$_{primary}$ from the storage service provided by the CP mobile service;
   invoking, by the cipher key manager, the key obfuscator module to de-obfuscate OSPK to obtain SPK;
   using SPK to decrypt (E-SPAK)$_{primary}$ to obtain (SPAK)$_{primary}$;
   decrypting (E-SPAK)$_{auxiliary}$ using (SPAK)$_{primary}$ to obtain (SPAK)$_{auxiliary}$;
   calling, by the cipher key manager, the two-way function f( ) with (SPAK)$_{primary}$ and (SPAK)$_{auxiliary}$ as inputs;
   receiving, from the two-way function f( ), SPAK as output;
   reading, by the cipher key manager, the encrypted DEK (E-DEK) in the keychain persistent store;
   decrypting, by the cipher key manager, the E-DEK using SPAK to obtain DEK;
   fetching, by the cipher key manager, the encrypted data requested by the auxiliary process; and
   decrypting, by the cipher key manager, the data using DEK and sending the decrypted data to the higher calling modules.

22. The method of claim 21, wherein the primary process is associated with a containing application and the auxiliary process is associated with an application extension.

* * * * *